US006788347B1

(12) United States Patent
Kim et al.

(10) Patent No.: US 6,788,347 B1
(45) Date of Patent: Sep. 7, 2004

(54) HDTV DOWNCONVERSION SYSTEM

(75) Inventors: Hee-Yong Kim, Plainsboro, NJ (US); Saiprasad Naimpally, Langhorne, PA (US); Edwin Robert Meyer, Bensalem, PA (US); Richard Sita, Audubon, NJ (US); Larry Phillips, Collingswood, NJ (US); Ren Egawa, Princeton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/180,243

(22) PCT Filed: Mar. 11, 1998

(86) PCT No.: PCT/US98/04749

§ 371 (c)(1),
(2), (4) Date: Apr. 5, 1999

(87) PCT Pub. No.: WO98/41011

PCT Pub. Date: Sep. 17, 1998

Related U.S. Application Data

(60) Provisional application No. 60/040,517, filed on Mar. 12, 1997.

(51) Int. Cl.$^7$ ............................ H04N 11/20; H04N 7/01
(52) U.S. Cl. ....................... 348/441; 348/403; 348/448; 348/458
(58) Field of Search ................................. 348/441, 445, 348/459, 446, 443, 554, 555, 556, 558

(56) References Cited

U.S. PATENT DOCUMENTS

| | | |
|---|---|---|
| 3,997,772 A | 12/1976 | Crochiere et al. |
| 4,468,688 A | 8/1984 | Gabriel et al. |
| 4,472,732 A | 9/1984 | Bennett et al. |
| 4,472,785 A | 9/1984 | Kasuga |

(List continued on next page.)

FOREIGN PATENT DOCUMENTS

| | | |
|---|---|---|
| EP | 0 515 143 A2 | 11/1992 |
| EP | 0 598 184 A2 | 5/1994 |
| EP | 0 707 426 A2 | 4/1996 |
| EP | 0 725 538 A2 | 8/1996 |
| JP | 08-181988 | 7/1996 |
| WO | WO 96/19077 | 6/1996 |
| WO | WO 97/01934 | 1/1997 |

OTHER PUBLICATIONS

Jill Boyce, John Henderson and Larry Pearlstein, "SDTV Receivers with HDTV Decoding Capability," ACATS Technical Subgroup Meeting, May 18, 1995, Washington, D.C. ,(18 pp).

(List continued on next page.)

*Primary Examiner*—John Miller
*Assistant Examiner*—Trang U. Tran
(74) *Attorney, Agent, or Firm*—RatnerPrestia

(57) ABSTRACT

A video decoder compliant with the Advanced Television Systems Standard (ATSC) includes circuitry which decodes an ATSC encoded image and employs a downconversion process to produce a standard definition video signal. The video decoder includes a frequency-domain filter to reduce the resolution of the ATSC encoded signal. The video decoder downconversion system also includes a formatting section having vertical and horizontal filters, as well as resampling processing, to format the decoded and downconverted video image for a particular display and aspect ratio. The decoder senses the display format of the encoded video signal and changes the processing provided by the decoder to produce a standard definition output signal regardless of the display format of the encoded input signal. The system also includes a format converter which may be programmed to use a plurality of methods to convert the aspect ratio of the input signal for display on a display device having a different aspect ratio. In one mode, the system sequences through the possible methods to allow the user to select one method.

18 Claims, 23 Drawing Sheets

U.S. PATENT DOCUMENTS

| | | | |
|---|---|---|---|
| 4,536,745 A | | 8/1985 | Yamaguchi et al. |
| 4,631,750 A | | 12/1986 | Gabriel et al. |
| 4,652,908 A | | 3/1987 | Fling et al. |
| 4,774,581 A | | 9/1988 | Shiratsuchi |
| 4,870,661 A | | 9/1989 | Yamada et al. |
| 4,908,874 A | | 3/1990 | Gabriel |
| 5,028,995 A | | 7/1991 | Izawa et al. |
| 5,057,911 A | | 10/1991 | Stec et al. |
| 5,262,854 A | | 11/1993 | Ng |
| 5,274,372 A | | 12/1993 | Luthra et al. |
| 5,327,235 A | | 7/1994 | Richards |
| 5,331,346 A | | 7/1994 | Shields et al. |
| 5,389,923 A | | 2/1995 | Iwata et al. |
| 5,481,568 A | | 1/1996 | Yada |
| 5,483,474 A | | 1/1996 | Arbeiter et al. |
| 5,489,903 A | | 2/1996 | Wilson et al. |
| 5,519,446 A | * | 5/1996 | Lee .......................... 348/556 |
| 5,528,301 A | | 6/1996 | Hau et al. |
| 5,613,084 A | | 3/1997 | Hau |
| 5,737,019 A | | 4/1998 | Kim |
| 5,754,437 A | * | 5/1998 | Blazo ........................ 364/484 |
| 5,835,151 A | * | 11/1998 | Sun et al. .................. 348/441 |
| 6,104,753 A | * | 8/2000 | Kim et al. .................. 348/402 |
| 6,262,770 B1 | * | 7/2001 | Boyce et al. ............... 348/402 |
| 6,292,621 B1 | * | 9/2001 | Tanaka et al. ............... 386/56 |

OTHER PUBLICATIONS

K. Blair Benson, revised by Jerry Whitaker, "Television Engineering Handbook," (Revised Copyright 1992, 1986 by McGraw–Hill, Inc., (7 pp.).

Jill Boyce and Larry Pearlstein, "Low–Cost all Format ATV Decoding with Improved Quality" 30th Advanced Motion Imaging Conference, Paper #11, Feb. 2, 1996 (7 pp.).

Jack S. Fuhrer, "The All Format Decoder", Hitachi America, Ltd., Jun. 3, 1996.

"Recommended Practices for Video Encoding Using the ATSC Digital Television Standard–Consideration of Down-sampling Decoders", Jun. 3, 1996 (6 pp.).

Larry Pearlstein "Discussion on Recommended Practices for North American ATV Coding", Hitachi America Ltd., Presented to SMPTE WG TVCM, Mar. 8, 1996 (8 pp.).

Data Sheet "GP9101 High Performance Multirate Digital Filter", Gennum Corporation, Jan., 1994 (21 pp.).

Aldo Cugnini and Richard Shen, "MPEG–2 Video Decover for the Digital HDTV Grand Alliance System," 8037 IEEE Transactions on Consumer Electronics, vol. 41, No. 3, Aug. 1995, pps. 748–753.

Mihailo M. Stojancic and Chuck Ngai, "Architecture and VLSI Implementation of the MPEG–2:MP@ML Video Decoding Process," 8012 SMPTE Journal, vol. 104, No. 2, Feb. 1995, pps. 62–72.

International Search Report, Jun. 23, 1998, (PCT/US98/04749).

* cited by examiner

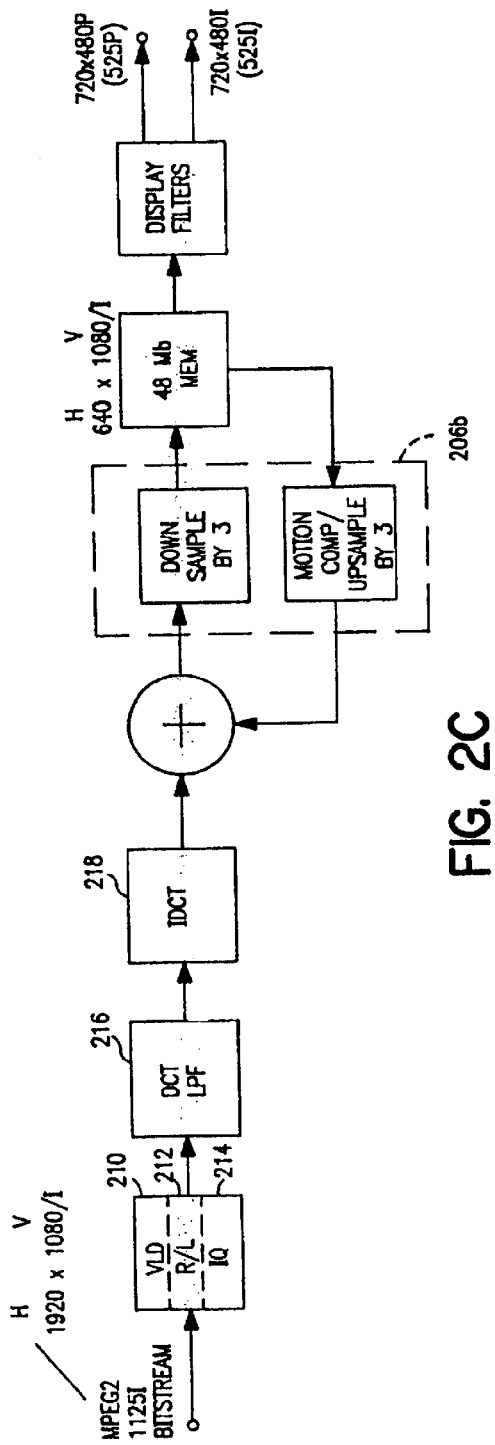
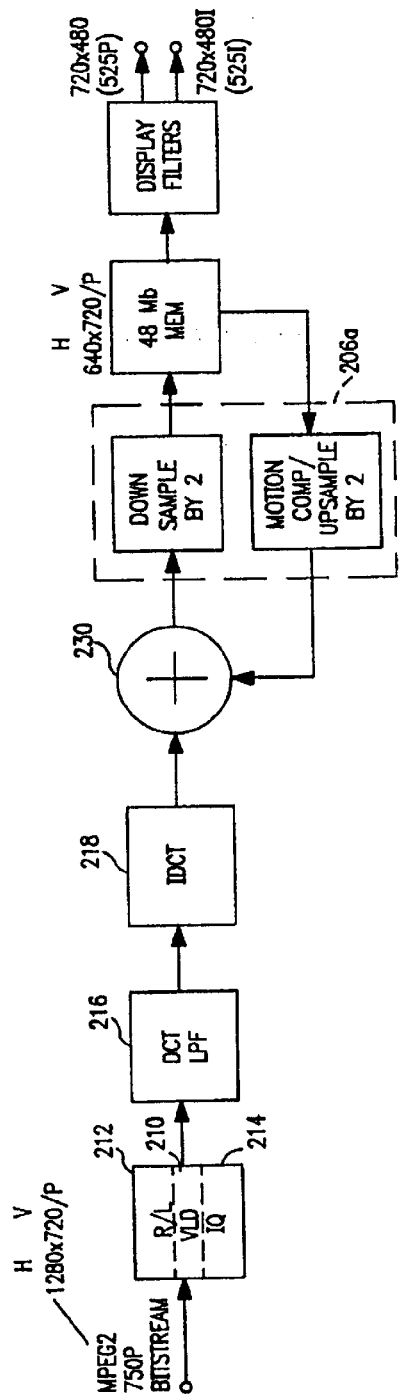
FIG. 2C
FIG. 2D

|  |  | SUBPIXEL POSITION |
|---|---|---|
| ▫ ▲▲ ▲▲▲ ▲ ▲ ▲▲▲ ▲▲▲▲▲ ▲ ● ● | | 0 |
| ▫ ● ▲ ▲▲▲▲ ▲▲ ▲▲▲▲▲▲ ▲▲ ▲ ● | ▫ | 1 |
| ● ● ▲▲▲▲ ▲▲▲ ▲▲▲▲▲▲ ▲▲▲ ▲▲ | ▫ | 2 |

|  |  | SUBPIXEL POSITION |
|---|---|---|
| ▫ ▫ ▲▲▲▲▲ ▲▲ ▲▲▲▲ ▲▲○ ▫ ▫ | | 0 |
| ▫ ▫ ● ▲▲▲▲ ▲▲▲▲▲▲ ▲▲▲ ▫ ▫ | | 1 |

FIG. 3A

HDTV DOWNCONVERSION SYSTEM

This patent application claims the benefit of U.S. Provisional Application No. 60/040,517 filed Mar. 12, 1997 and is a continuation-in-part of prior application Ser. No. 593,672, filed Jan. 29, 1996, U.S. Pat. No. 5,737,019.

The entire disclosure of U.S. Provisional Application No. 60/040,517 is expressly incorporated herein by reference.

FIELD OF THE INVENTION

This invention relates to a decoder for receiving, decoding and conversion of frequency domain encoded signals, e.g. MPEG-2 encoded video signals, into standard output video signals, and more specifically to a decoder which converts and formats an encoded high resolution video signal to a decoded lower resolution output video signal.

BACKGROUND OF THE INVENTION

In the United States a standard, the Advanced Television System Committee (ATSC) standard defines digital encoding of high definition television (HDTV) signals. A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 567 lines per frame. At a frame rate of 30 frames per second, signals encoded according to this standard have a data rate of 720*567*30 or 12,247,200 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile Main Level standard. The standard for HDTV encoding in the United States is a subset of this standard, having as many as 1,080 lines per frame, 1,920 pixels per line and a maximum frame rate, for this frame size, of 30 frames per second. The maximum data rate for this standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer, and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

Format conversion of encoded high resolution Main Profile, High Level pictures to lower resolution Main Profile, High Level pictures; Main Profile, Main Level pictures, or other lower resolution picture formats, has gained increased importance for a) providing a single decoder for use with multiple existing video formats, b) providing an interface between Main Profile, high level signals and personal computer monitors or existing consumer television receivers, and c) reducing implementation costs of HDTV. For example, conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors. One aspect, down conversion, converts a high definition input picture into lower resolution picture for display on the lower resolution monitor.

To effectively receive the digital images, a decoder should process the video signal information rapidly. To be optimally effective, the decoding systems should be relatively inexpensive and yet have sufficient power to decode these digital signals in real time. Consequently, a decoder which supports conversion into multiple low resolution formats must minimize processor memory.

SUMMARY OF THE INVENTION

The present invention is embodied in a digital video signal processing system which receives, decodes and displays video signals that have been encoded in a plurality of different formats. The system includes a digital video decoder which may be controlled to decode the encoded video signal and, optionally, provide a reduced resolution version of the decoded video signal. The system processes the received encoded video signal to determine the format and resolution of the image which would be produced if the signal were decoded. The system includes a controller which receives the determined format and resolution information and which also receives information concerning the format and resolution of a display device on which the received image will be displayed. The controller then generates signals to cause the digital video decoder to provide an analog video signal having a resolution and aspect ratio that is appropriate for the display device.

According to one aspect of the invention, the encoded video signals are encoded using a frequency-domain transform operation and the digital video decoder includes a low-pass filter which operates on the frequency-domain transformed digital video signal.

According to another aspect of the invention, digital video decoder is coupled to a programmable spatial filter which is responsive to a control signal provided by the controller to resample the decoded digital video signal provided by the digital video decoder to produce a digital video signal which conforms to the aspect ratio and resolution of the display device.

According to another aspect of the invention, the digital video signal is encoded according to using an encoding technique specified by the moving pictures experts group (MPEG) and the aspect ratio and resolution of the encoded video signal are extracted from the header of a packetized elementary stream (PES) packet received by the digital video decoder.

According to another aspect of the invention, the digital video signal is encoded according to using an encoding technique specified by the moving pictures experts group (MPEG) and the aspect ratio and resolution of the encoded video signal are extracted from a sequence header of a video bit-stream received by the digital video decoder.

According to another aspect of the invention, the system includes a user input device through which a user may configure the system to produce an output video signal which is compatible with the display device.

According to another aspect of the invention, the system includes apparatus which automatically determines the aspect ratio and resolution of the display device.

According to another aspect of the invention, the system includes apparatus which sequentially produces video signals corresponding to a plurality of display device types and is responsive to a selection signal provided by a user to identify one of the display types as corresponding in resolution and aspect ratio to the display device.

BRIEF DESCRIPTION OF THE DRAWINGS

These and other features and advantages of the present invention will become apparent from the following detailed description, taken in conjunction with the accompanying drawings, wherein:

FIG. 2C is a block diagram which illustrates a configuration of the decoder shown in FIG. 2B which is used to decode a video signal in 1125I format including a downconversion by factor of 3 to 525P/525I format.

FIG. 2D is a block diagram which illustrates a configuration of the decoder shown in FIG. 2B which is used to decode a video signal in 750P format including a downconversion by factor of 2 to 525P/525I format.

FIG. 3A is a pixel chart which illustrates subpixel positions and corresponding predicted pixels for the 3:1 and 2:1 exemplary embodiments of the present invention.

DETAILED DESCRIPTION

System Overview

The exemplary embodiments of the invention decode conventional HDTV signals which have been encoded according to the MPEG-2 standard and in particular, the Main Profile High Level (MP@HL) and the Main Profile Main Level (MP@ML) MPEG-2 standards, and provides the decoded signals as video signals having a lower resolution than that of the received HDTV signals and having a selected one of multiple formats.

The MPEG-2 Main Profile standard defines a sequence of images in five levels: the sequence level, the group of pictures level, the picture level, the slice level, and the macroblock level. Each of these levels may be considered to be a record in a data stream, with the later-listed levels occurring as nested sub-levels in the earlier listed levels. The records for each level include a header section which contains data that is used in decoding its sub-records.

Each macroblock of the encoded HDTV signal contains six blocks and each block contains data representing 64 respective coefficient values of a discrete cosine transform (DCT) representation of 64 picture elements (pixels) in the HDTV image.

In the encoding process, the pixel data may be subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

The video decoder of the present invention is designed to support a number of different picture formats, while requiring a minimum of decoding memory for downconversion of high resolution encoded picture formats, for example, 48 Mb of Concurrent Rambus dynamic random access memory (Concurrent RDRAM).

Figure 1A:
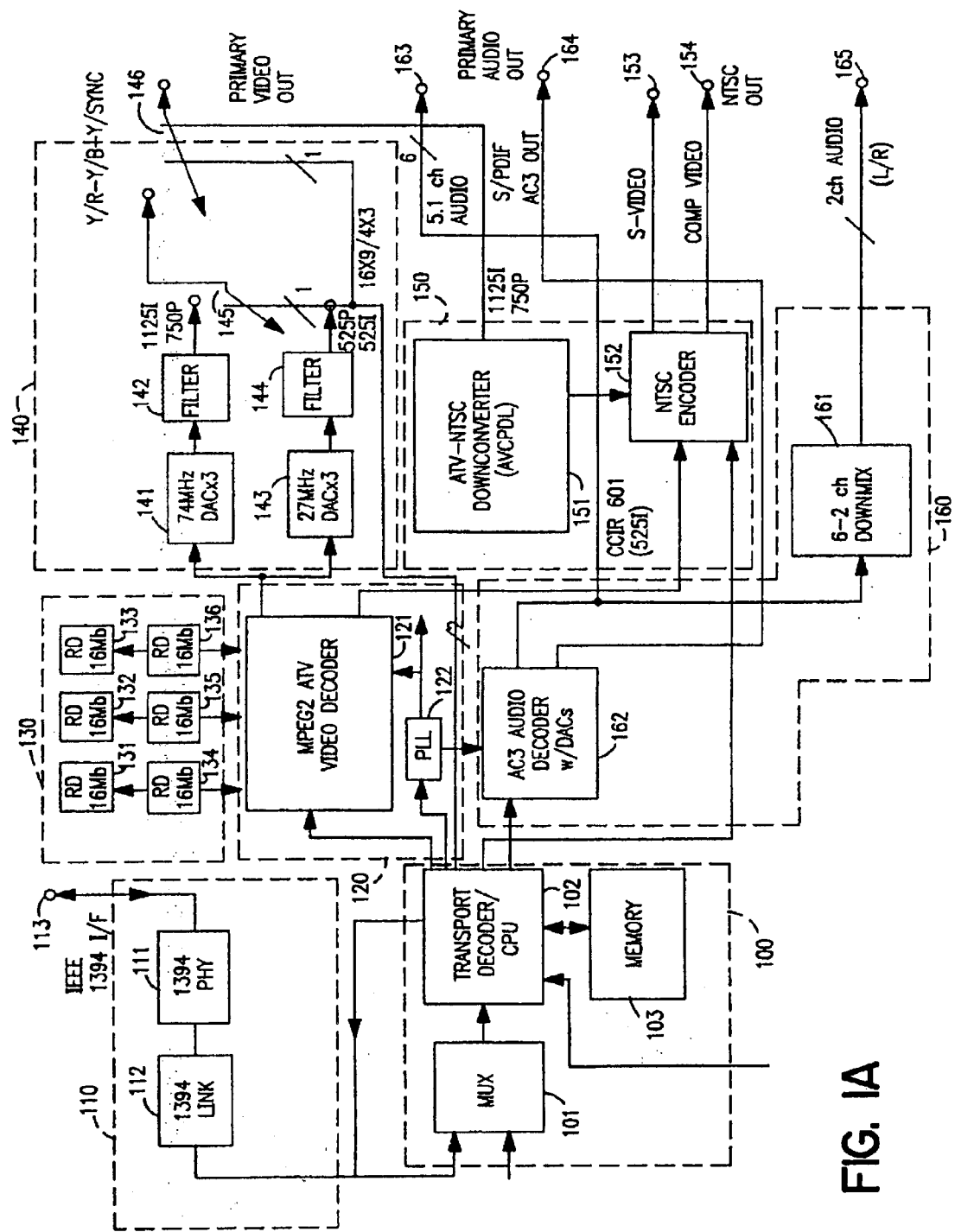
FIG. 1A is a high level block diagram of a video decoding and format conversion system according to an exemplary embodiment of the present invention.

FIG. 1A shows a system employing an exemplary embodiment of the present invention for receiving and decoding encoded video information at MP@HL or at MP@ML, formatting the decoded information to a user selected output video format (which includes both video and audio information), and interfaces for providing the formatted video output signals to display devices. The exemplary embodiments of the present invention are designed to support all ATSC video formats; and in a Down Conversion (DC) mode the present invention receives any MPEG Main Profile video bitstream (constrained by FCC standards) and provides a 525P, 525I or NTSC format picture.

The exemplary system of FIG. 1A includes a front end interface 100, a video decoder section 120 and associated Decoder Memory 130, a primary video output interface 140, an audio decoder section 160, an optional computer interface 110, and an optional NTSC video processing section 150.

Referring to FIG. 1A, the exemplary system includes a front end interface 100, having a transport decoder and processor 102 with associated memory 103. Also included may be an optional multiplexer 101 for selecting received control information and computer generated images from the computer interface 110 at, for example, the IEEE 1394 link layer protocol or for recovering an encoded transport stream from a digital television tuner (not shown). The transport decoder 102 converts the received compressed data bit stream from the communication channel bit stream into compressed video data, which may be, for example, packetized elementary streams (PES) packets according to MPEG-2 standard. The transport decoder may provide either the PES packets directly, or may further convert the PES packets into one or more elementary streams.

The video decoder section includes an ATV Video Decoder 121 and phase-locked loop (PLL) 122. The ATV video Decoder 121 receives an elementary stream or video (PES) packets from the front end interface 100, from the front end interface and converts the packets to the elementary stream. A front end picture processor of the ATV Video Decoder 121 then decodes the elementary streams according to the encoding method used, to provide luminance and chrominance pixel information for each image picture. The PLL 122 synchronizes the audio and video processing performed by the system shown in FIG. 1A.

The ATV Video Decoder 121 further includes a memory subsystem to control decoding operations using an external memory which provides image picture information and a display section to process decoded picture information into a desired picture format. The ATV Video Decoder 121 employs the Decoder Memory 130 to process the encoded video signal. The Decoder Memory 130 includes memory units 131, 132, 133, 134, 135 and 136, which may each be a 16 Mb RDRAM memory. Exemplary embodiments the present invention are subsequently described with respect to, and implemented within, the video decoder section 120 and Decoder Memory 130.

The primary video output interface 140 includes a first Digital to Analog (D/A) converter (DAC) 141 (which actually has three D/A units for the luminance signal and the $C_R$ and $C_B$ chrominance signals) which may operate at 74 MHz, followed by a filter 142. This interface produces analog video signals having a 1125I or 750P format. The interface 140 and also includes a second (D/A) converter (DAC) 143 (also with three D/A units for luminance signal and $C_R$ and $C_B$ chrominance signals) which may operate at 27 MHz, followed by a filter 142 for video signals having a 525I or 525P format. The primary video output interface 140 converts the digitally encoded video signals having a desired format, creates an analog video signal having chrominance and luminance components with the desired format using a (D/A) converter, and filters the analog video signal to remove sampling artifacts of the D/A conversion process.

The audio decoder section 160 includes an AC3 Audio decoder 162 which provides audio signals at output ports 163 and 164, and optional 6-2 channel down mixing processor 161 to provide 2 channel audio signals at output port 165. The audio processing of MP@HL MPEG-2 standard audio signal components from encoded digital information to analog output at output ports 163, 164 and 165 is well known in the art, and an audio decoder suitable for use as the decoder 160 is a ZR38500 Six Channel Dolby Digital Surround Processor, available from the Zoran Corporation of Santa Clara, Calif.

The optional computer interface 110 transmits and receives computer image signals which conform, for example, to the IEEE 1394 standard. The computer interface 110 includes a physical layer processor 111 and link layer processor 112. The physical layer processor 111 converts electrical signals from output port 113 into received computer generated image information and control signals, and provides these signals, for decoding by the link layer processor 112 into IEEE 1394 formatted data. The physical layer processor 111 also converts received control signals encoded by the link layer processor 112 originating from the transport decoder 102 into electrical output signals according to the IEEE 1394 standard.

The NTSC video processing section 150 includes an optional ATV-NTSC Downconversion processor 151 which converts the analog HDTV signal provided by the filter 142 into a 525 I signal. This conversion between standards is known in the art and may be accomplished using spatial filtering techniques such as those disclosed in, for example, U.S. Pat. No. 5,613,084 to Hau et al. entitled INTERPOLATION FILTER SELECTION CIRCUIT FOR SAMPLE RATE CONVERSION USING PHASE QUANTIZATION, which is incorporated herein by reference. In the exemplary embodiment of the invention, this processing section is used only when the decoder processes a 1080I or 1125I signal.

The NTSC encoder 152 receives a 525I analog signal either from the processor 151 or directly from the decoder 120, and converts the signal to the NTSC formatted video signal at output ports 153 (S-video) and 154 (composite video).

Video Decoder Section Employing Decoder Memory

Figure 1B:
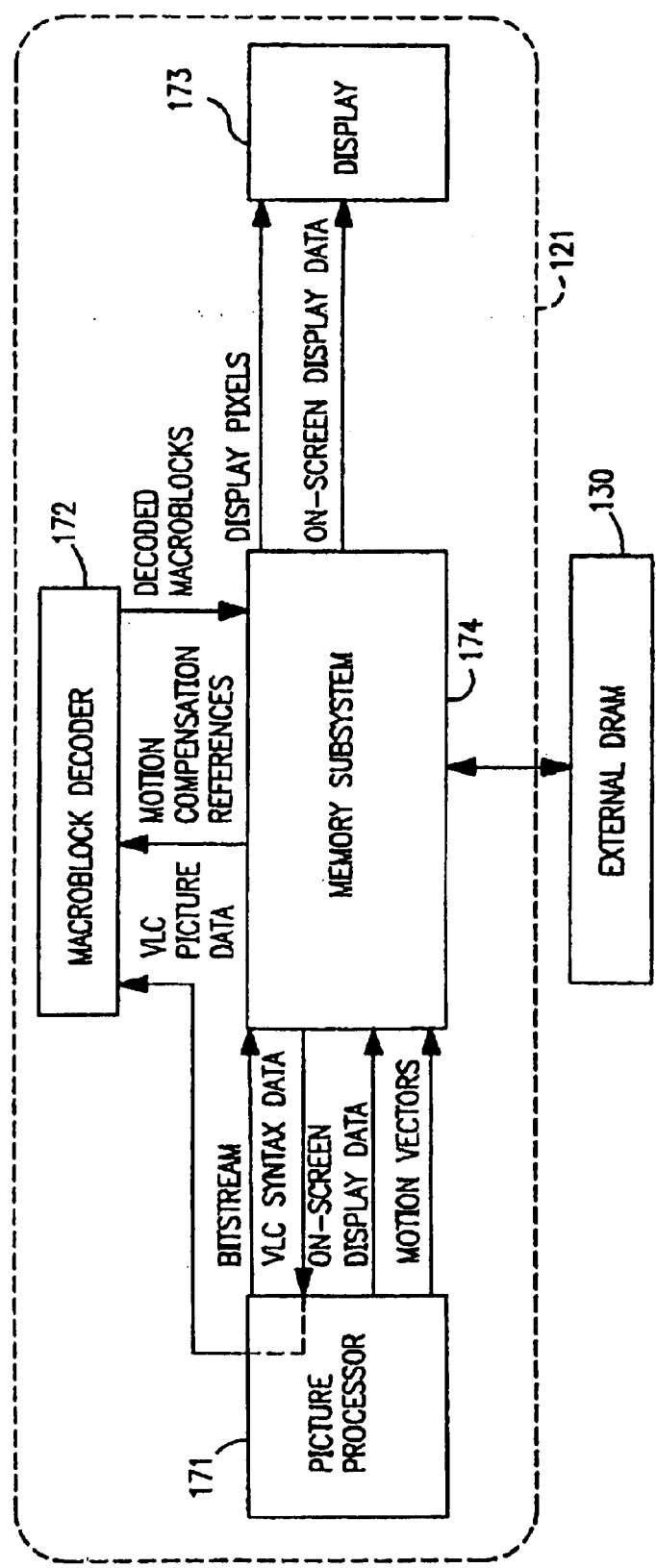
FIG. 1B is a high level block diagram showing the functional blocks of the ATV Video Decoder including an interface to external Memory as employed in an exemplary embodiment of the present invention.

FIG. 1B is a high level block diagram showing the functional blocks of the ATV Video Decoder 121 including an interface to external Memory 130 as employed in an exemplary embodiment of the present invention. The ATV Video Decoder 121 includes a Picture Processor 171, a Macroblock Decoder 172, a Display section 173, and a Memory subsystem 174. The Picture processor 171 receives, stores and partially decodes the incoming MPEG-2 video bitstream and provides the encoded bitstream, on-screen display data, and motion vectors, which may be stored in memory 130 under the control of the Memory subsystem 174. The Macroblock Decoder 172 receives the encoded bitstream, motion vectors, and stored motion compensation reference image data, if predictive encoding is used, and provides decoded macroblocks of the encoded video image to the memory subsystem 174. The Display Section 173 retrieves the decoded macroblocks from the Memory subsystem 174 and formats these into the video image picture for display. The operation of these sections is described in detail below.

a) Main Profile Format Support for Picture Processing

The ATV video decoder 121 of the present invention is designed to support all ATSC video formats. For simplicity, the operation of the ATV video decoder 121 is termed Down Conversion (DC), and ATV video decoder 121 receives any MPEG Main Profile video bitstreams shown in Table 1 and provides a 525P, 525I or NTSC format video signal. For the exemplary video decoder of FIG. 1A, in DC mode, any HDTV or SDTV signal is decoded and a display output signal provided at either of two ports, with port one providing either a progressive or interlaced image, and port two providing an interlaced image.

TABLE 1

Video Bitstream Formats

| Number and Format | Horizontal | Vertical | Aspect Ratio | Frame rate (Hz) |
|---|---|---|---|---|
| (1) 1125I | 1920 | 1080 | 16 × 9 | 30, 29.97 |
| (2) 1125P | 1920 | 1080 | 16 × 9 | 30, 29.97, 24, 23.98 |
| (3) 750P | 1280 | 720 | 16 × 9 | 60, 59.94, 30, 29.97, 24, 23.98 |
| (4) 525P | 704 | 480 | 16 × 9 | 60, 59.94, 30, 29.97, 24, 23.98 |
| (5) 525P | 704 | 480 | 4 × 3 | 60, 59.94, 30, 29.97, 24, 23.98 |
| (6) 525P | 640 | 480 | 4 × 3 | 60, 59.94, 30, 29.97, 24, 23.98 |
| (7) 525I | 704 | 480 | 16 × 9 | 30, 29.97 |
| (8) 525I | 704 | 480 | 4 × 3 | 30, 29.97 |
| (9) 525I | 640 | 480 | 4 × 3 | 30, 29.97 |

In DC mode, low pass filtering of the high frequency components of the Main Level picture occurs as part of the decoding process to adjust the resolution of the high resolution picture to a format having a lower resolution. This operation includes both horizontal and vertical filtering of the high resolution picture. Note that in DC Mode, the display format conversion may display 16×9 aspect ratio sources on 4×3 displays, and vice-versa. This process is described subsequently with reference to the display section of the video decoder section 120. Table 2 gives the supported primary and secondary output picture formats for the respective input bitstreams of Table 1:

TABLE 2

DC Supported Video Formats

| Number and Format | Primary Output Format | Secondary Output Format | Display Clock (MHz) |
|---|---|---|---|
| (1) 1125I | 525P | 525I | 27.00 |
| (2) 1125P | 525P | 525I | 27.00 |
| (3) 750P | 525P | 525I | 27.00 |
| (4) 525P | 525P | 525I | 27.00 |
| (5) 525P | 525P | 525I | 27.00 |
| (6) 525P | 525P | 525I | 27.00 |
| (7) 525I | 525P | 525I | 27.00 |
| (8) 525I | 525P | 525I | 27.00 |
| (9) 525I | 525P | 525I | 27.00 | b) Decoding, Downconversion and Downsampling

1) Overview

Figure 2A:
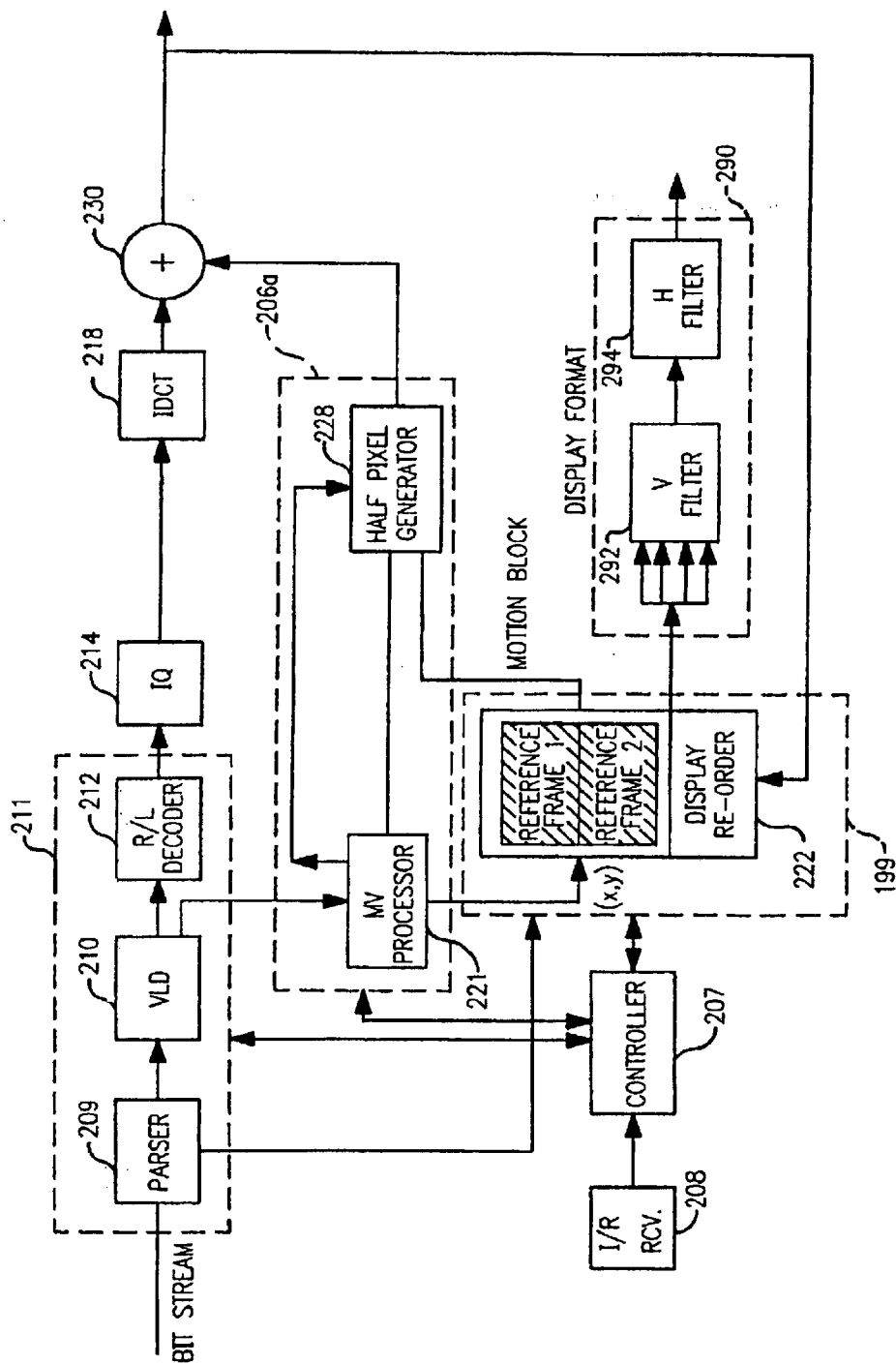
FIG. 2A is a high level block diagram of a video decoder of the prior art.

FIG. 2A is a high level block diagram of a typical video decoding system of the prior art which processes an MPEG-2 encoded picture. The general methods used to decode an MPEG-2 encoded picture, without subsequent processing, downconversion or format conversion, are specified by the MPEG-2 standard. The video decoding system includes an entropy decoder (ED) 211, which may include a parser 209, a variable length decoder (VLD) 210 and run length decoder 212. The system also includes an inverse quantizer 214, and inverse discrete cosine transform (IDCT) processor 218. A Controller 207 controls the various components of the decoding system responsive to the control information retrieved from the input bit stream by the ED 211. For processing of prediction images, the system further includes a memory 199 having reference frame memory 222, summing network 230, and Motion Compensation Processor 206a which may have a motion vector processor 221 and half-pixel generator 228.

The controller 207 is coupled to an infrared receiver 208 which receives command signals provided by, for example, a user remote control device. The controller 207 decodes these commands and causes the remainder of the system shown in FIG. 2A to perform the specified command. In the exemplary embodiment of the invention, the system shown in FIG. 2A includes a set-up mode in which the user may specify a configuration for the system. In one exemplary embodiment of the invention, this configuration may include the specification of a display device type. It is contemplated that the display device type may be specified in terms of display resolution and aspect ratio. The user may specify the display type by selecting a particular display aspect ratio and resolution from a menu of possible choices or by causing the system to enter a mode in which signals corresponding to different display formats are successively provided to the display device and the user is asked to indicate, via the remote control device, which display is most pleasing. During normal operation, the controller 207 also receives information on the resolution and aspect ratio of the encoded video signal from the parser 209 of the ED 211. Using this information and the stored information relating to the resolution and aspect ratio of the display device, the controller 207 automatically configures the system to process the received encoded signal to produce an analog output signal appropriate for display on the display device.

The parser 209 scans the received bit stream for MPEG start codes. These codes include a prefix which has a format of 23 consecutive zero-valued bits followed by a single bit having a value of one. The start code value follows this prefix and identifies the type of record that is being received. In the exemplary embodiment of the invention, when the parser 209 stores the bit stream into the memory 199 and the bit stream is then supplied from the memory 199 to the VLD for further processing. In the block diagram shown in FIG. 2A, this has been shortened to show the parser providing the bit stream directly to the VLD.

When the parser 209 finds a start code in the bit stream, it passes the bit stream onto the memory 199 for storage in the VBV buffer and also stores a pointer to the start code in an area of the memory 199 which is accessed by the controller 207. The controller 207 continually accesses the start code pointers and, through them, the record headers. When the controller 207 finds a sequence start code, it accesses information in the sequence header which indicates the aspect ratio and resolution of the image sequence that is represented by the encoded sequence. According to the MPEG standard, this information immediately follows the sequence start code in the sequence header.

Information on the display format of the encoded video signal (i.e. its resolution and aspect ratio) is also contained in the headers of the packetized elementary stream (PES) packets. It is contemplated that in another exemplary embodiment of the invention, the parser 209 may receive PES packets, strip the headers from them to reconstruct the bit stream and pass this header information, including the display format of the received video signal, to the controller 207.

As described below, the controller 207 uses information on the display format of the received video signal and information on the display format of the display device (not shown) which is connected to the decoder system to automatically or semiautomatically adjust the processing of the received video signal for proper display on the display device.

The VLD 210 receives the encoded bit stream from the parser 209 via the VBV buffer (not shown) in the memory 199, and reverses the encoding process to produce macroblocks of quantized frequency-domain (DCT) coefficient values. The VLD 210 also provides control information including motion vectors describing the relative displacement of a matching marcoblock in a previously decoded image which corresponds to a macroblock of the predicted picture that is currently being decoded. The Inverse Quantizer 214 receives the quantized DCT transform coefficients and reconstructs the quantized DCT coefficients for a particular macroblock. The quantization matrix to be used for a particular block is received from the ED 211.

The IDCT processor 218 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values provided by the IDCT Processor 218 are the pixel values of the corresponding macroblock of the current video image. If the macroblock is interframe encoded, the corresponding macroblock of the previous video picture frame is stored in memory 199 for use by the Motion Compensation processor 206. The Motion Compensation Processor 206 receives a previously decoded macroblock from memory 199 responsive to the motion vector, and then adds the previous macroblock to the current IDCT macroblock (corresponding to a residual component of the present predictively encoded frame) in summing network 230 to produce the corresponding macroblock of pixels for the current video image, which is then stored into the reference frame memory 222.

Figure 2B:
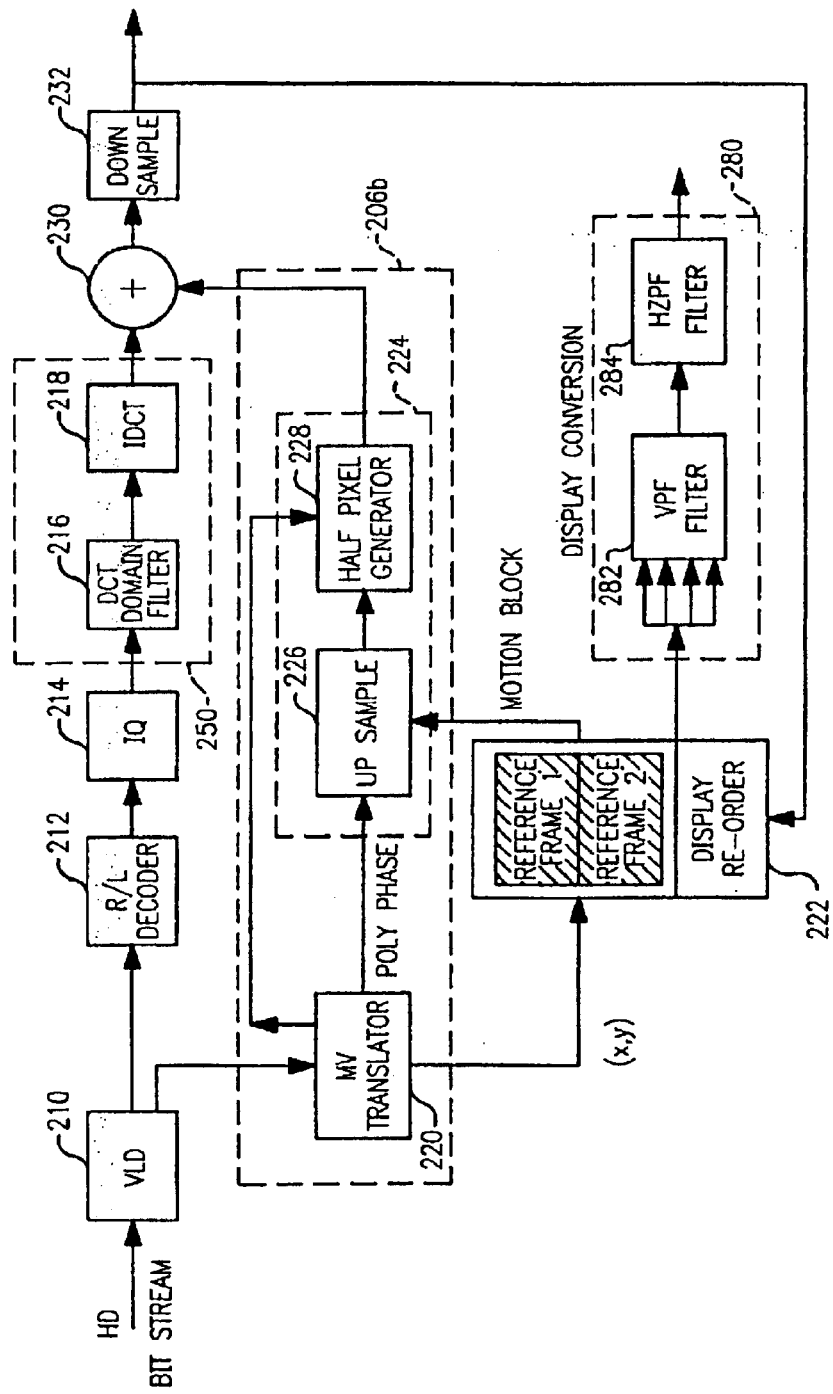
FIG. 2B is a high level block diagram of the down conversion system as employed by an exemplary embodiment of the present invention.

FIG. 2B is a high level block diagram of the down conversion system of one exemplary embodiment of the present invention employing such a DCT filtering operation, and which may be employed by an exemplary embodiment of the present invention in DC mode. As shown in FIG. 2B, the down conversion system includes a variable length decoder (VLD) 210, a run-length (R/L) decoder 212, an inverse quantizer 214, and inverse discrete cosine transform (IDCT) processor 218. In addition, the down conversion system includes a Down Conversion filter 216 for filtering encoded pictures and a Down Sampling processor 232. While the following describes the exemplary embodiment for a MP@HL encoded input, the present invention may be practiced with any similarly encoded high-resolution image bit stream.

The down conversion system also includes a Motion Compensation Processor 206b including a Motion Vector (MV) Translator 220, a Motion Block Generator 224 including an Up-Sampling Processor 226, Half-Pixel Generator 228, and a Reference Frame Memory 222.

The system of the first exemplary embodiment of FIG. 2B also includes a Display Conversion Block 280 having a Vertical Programmable Filter (VPF) 282 and Horizontal Programmable Filter (HZPF) 284. The Display Conversion Block 280 converts downsampled images into images for display on a particular display device having a lower resolution than the original image, and is described in detail subsequently in section d)(2) on Display Conversion.

The Down Conversion Filter 216 performs a lowpass filtering of the high resolution (e.g. Main Profile, High Level DCT) coefficients in the frequency domain. The Down Sampling Process 232 eliminates spatial pixels by decimation of the filtered Main Profile, High Level picture to produce a set of pixel values which can be displayed on a monitor having lower resolution than that required to display a MP@HL picture. The exemplary Reference Frame Memory 222 stores the spatial pixel values corresponding to at least one previously decoded reference frame having a resolution corresponding to the down-sampled picture. For interframe encoding, the MV Translator 220 scales the motion vectors for each block of the received picture consistent with the reduction in resolution, and the High Resolution Motion Block Generator 224 receives the low resolution motion blocks provided by the Reference Frame Memory 222, upsamples these motion blocks and performs half-pixel interpolation as needed to provide motion blocks which have pixel positions that correspond to the decoded and filtered differential pixel blocks.

Note that in the down conversion system of FIG. 1B the downsampled images are stored rather than high definition images, resulting in a considerable reduction of memory required for storing reference images.

The operation of an exemplary embodiment of the down-conversion system of the present invention for intra-frame encoding is now described. The MP@HL bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214.

Since the received video image represented by the DCT coefficients is a high resolution picture, the exemplary embodiment of the present invention employs lowpass filtering of the DCT coefficients of each block before decimation of the high resolution video image. The inverse quantizer 214 provides the DCT coefficients to the DCT filter 216 which performs a lowpass filtering in the frequency domain by weighting the DCT coefficients with predetermined filter coefficient values before providing them to the IDCT processor 218. For one exemplary embodiment of the present invention, this filter operation is performed on a block by block basis.

The IDCT processor 218 provides spatial pixel sample values by performing an inverse discrete cosine transform of the filtered DCT coefficients. The Down Sampling processor 232 reduces the picture sample size by eliminating spatial pixel sample values according to a predetermined decimation ratio; therefore, storing the lower resolution picture uses a smaller frame memory compared to that which would be needed to store the higher resolution MP@HL picture.

The operation of an exemplary embodiment of the down-conversion system of the present invention for predicted frames of the encoding standard is now described. In this example, the current received image DCT coefficients represent the DCT coefficients of the residual components of the predicted image macroblocks, which is now referred to as a predicted frame (P-frame) for convenience. In the described exemplary embodiment, the horizontal components of the motion vectors for a predicted frame are scaled since the low resolution reference pictures of previous frames stored in memory do not have the same number of pixels as the high resolution predicted frame (MP@HL).

Referring to FIG. 2B, the motion vectors of the MP@HL bit stream provided by the VLD 210 are provided to the MV Translator 220 Each motion vector is scaled by the MV Translator 220 to reference the appropriate prediction block of the reference frame of a previous image stored in reference frame memory 222 of memory 199. The size (number of pixel values) in the retrieved block is smaller than block provided by the IDCT processor 218; consequently, the retrieved block is upsampled to form a prediction block having the same number of pixels as the residual block provided by the IDCT Processor 218 before the blocks are combined by the summing network 230.

The prediction block is upsampled by the Up-Sampling Processor 226 responsive to a control signal from the MV Translator 220 to generate a block corresponding to the original high resolution block of pixels, and then half pixel values are generated—if indicated by the motion vector for the up-sampled prediction block in the Half Pixel Generator 228—to ensure proper spatial alignment of the prediction block. The upsampled and aligned prediction block is added in summing network 230 to the current filtered block, which is, for this example, the reduced resolution residual component from the prediction block. All processing is done on a macroblock by macroblock basis. After the motion compensation process is complete for the current high-resolution macroblock, the reconstructed macroblock is decimated accordingly by the Down Sampling Processor 232. This process does not reduce the resolution of the image but simply removes redundant pixels from the low resolution filtered image.

Once the downsampled macroblocks for an image are available, the Display Conversion Block 280 adjusts the image for display on a low resolution television display unit by filtering the vertical and horizontal components of the downsampled image in VPF 282 and HZPF 284 respectively.

The relationship between the functional blocks of the ATV Video Decoder 121 of FIG. 1A and FIG. 1B is now described. The picture processor 171 of FIG. 1B receives the video picture information bitstreams. The Macroblock Decoder 172 includes VLD 210, inverse quantizer 214, the DCT filter 216, IDCT 218, summing network 230, and the motion compensated predictors 206a and 206b. The picture processor 171 may share the VLD 210. External Memory 130 corresponds to memory 199, with 16 Mb RDRAM 131–136 containing the reference frame memory 222.

FIG. 2C illustrates the operation of the system in DC mode, converting an 1125I signal to 525P/525I format. In this scenario, after low pass filtering by DCT filter 216 as described above with reference to FIG. 2B, the system down samples the high resolution signal by a factor of 3, and stores the pictures in the 48 Mb memory as 640H and 1080 V, interlaced. For this system, the motion compensation process upsamples the stored pictures by a factor of 3 (as well as translation of the received motion vectors) before motion-predictive decoding is accomplished. Also, the picture is filtered horizontally and vertically for display conversion.

FIG. 2D similarly illustrates the relationship between DC mode format downconversion from 750P to 525P/525I format. This conversion operates in the same way as the 1125I to 525P/525I conversion except that downsampling for memory storage, and upsampling for motion compensation, is by a factor of 2.

2) Macroblock Prediction for Downconversion

For the exemplary downconversion process, since the reference frames of the previous images are down sized in the horizontal direction, the received motion vectors pointing to these frames may also be translated according to the conversion ratio. The following describes the motion translation for the luminance block in the horizontal direction. One skilled in the art could easily extend the following discussion to motion translation in the vertical direction if desired. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (1):

$$XH = 2x + mv_x \tag{1}$$

The pixel corresponding to the motion block starts in the down-sampled image, and has an address denoted as x* and y* may be determined using equation (2).

$$x^* = \frac{XH}{2 \cdot Dx}; y^* = y \quad (2)$$

The division of equation (2) is an integer division with truncation.

Because the exemplary filter 216 and Down Sampling Processor 232 only reduce the horizontal components of the image, the vertical component of the motion vector is not affected. For the chrominance data, the motion vector is one-half of a luminance motion vector in the original picture. Therefore, definitions for translating the chrominance motion vector may also use the two equations (1) and (2).

Motion prediction is done by a two step process: first, pixel accuracy motion estimation in the original image frame may be accomplished by upsampling of down-sampled image frame in the Up Sampling Processor 226 of FIGS. 2A and 2B, then the half pixel Generator 228 performs a half pixel interpolation by averaging of nearest pixel values.

The reference image data is added to output data provided by the IDCT processor 218. Since the output values of the summing network 230 correspond to an image having a number of pixels consistent with a high resolution format, these values may be downsampled for display on a display having a lower resolution. Downsampling in the Down Sampling processor 232 is substantially equivalent to sub-sampling of an image frame, but adjustments may be made based upon the conversion ratio. For example, in the case of 3:1 downsampling, the number of horizontally down-sampled pixels are 6 or 5 for each input macroblock, and the first downsampled pixels are not always first pixel in the input macroblock.

After acquiring the correct motion prediction block from the down-sampled image, upsampling is used to get the corresponding prediction block in the high resolution picture. Consequently, subpixel accuracy in motion block prediction is desirable in the down sampled picture. For example, using 3:1 decimation, it is desirable to have 1/3 (or 1/6) subpixel accuracy in the down-converted picture for proper motion prediction. The subpixel which is a first pixel required by the motion vector, in addition to the down-sampled motion block, is determined. Then, subsequent subpixel positions are determined using modulo arithmetic as described in the following. The subpixel positions are denoted as $x_s$ as given in equation (3):

$$X_s = \left(\frac{XH}{2}\right) \% (Dx) \quad (3)$$

where "%" represents modulo division.

Figure 3A:
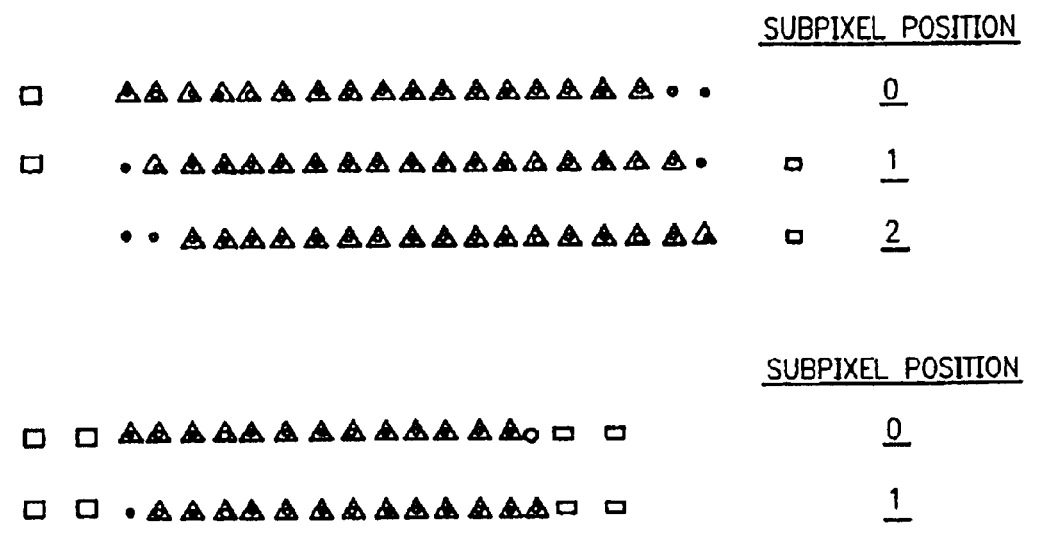

For example, the ranges of $x_s$ are 0, 1, 2 for 3:1 upsampling and 0, 1 for 2:1 upsampling. FIG. 3A shows subpixel positions and corresponding 17 predicted pixels for the 3:1 and 2:1 examples, and Table 3 gives the legend for FIG. 3A.

TABLE 3

| Symbol | Pixel |
|---|---|
| • | Downsampled Pixel |
| Δ | Upsampled Pixel |
| ○ | Prediction Pixel |
| □ | Extra Right and Left Pixels for Upsampling |

As previously described, the upsampling filters may be upsampling polyphase filters, and Table 4 gives characteristics of these upsampling polyphase interpolation filters.

TABLE 4

|  | 3:1 Upsampling | 2:1 Upsampling |
|---|---|---|
| Number of Polyphase Filters | 3 | 2 |
| Number of Taps | 3 | 5 |
| Maximum number of horizontal downsampled pixels | 9 | 13 |

Next two tables, Table 5 and Table 6, show polyphase filter coefficients for the exemplary 3:1 and 2:1 upsampling polyphase filters.

TABLE 5

3:1 Upsampling Filter

|  | Phase 0 | Phase 1 | Phase 2 |
|---|---|---|---|
| Double Precision | −0.1638231735591 | 0.0221080691070 | 0.3737642376078 |
|  | 0.7900589359512 | 0.9557838617858 | 0.7900589359512 |
|  | 0.3737642376078 | 0.0221080691070 | −0.1638231735591 |
| Fixed Point (9 bits) | −0.1640625 (−42) | 0.0234375 (6) | 0.3750000 (96) |
|  | 0.7890625 (202) | 0.95703125 (244) | 0.7890625 (202) |
|  | 0.3750000 (96) | 0.0234375 (6) | −0.1640625 (−42) |

TABLE 6

2:1 Upsampling Filter

|  | Phase 0 | Phase 1 |
|---|---|---|
| Double Precision | 0.0110396839260 | −0.1433363887113 |
|  | 0.0283886402920 | 0.6433363887113 |
|  | 0.9211433515636 | 0.6433363887113 |
|  | 0.0283886402920 | −0.1433363887113 |
|  | 0.0110396839260 | 0.0000000000000 |
| Fixed Point (9 bits) | 0.01718750 (3) | −0.14453125 (−37) |
|  | 0.02734375 (7) | 0.64453125 (165) |
|  | 0.92187500 (236) | 0.64453125 (165) |
|  | 0.02734375 (7) | −0.14453125 (−37) |
|  | 0.01718750 (3) | 0.00000000 (0) |

In a fixed point representation, the numbers in parenthesis of Table 5 and Table 6 are 2's complement representations in 9 bits with the corresponding double precision numbers are on the left. Depending upon the subpixel position of the motion prediction block in the downsampled reference image frame, one corresponding phase of the polyphase interpolation filter is used. Also, for the exemplary embodiment additional pixels on the left and right are used to interpolate 17 horizontal pixels in the original image frame. For example, in the case of 3:1 decimation, a maximum of 6 horizontally downsampled pixels are produced for each input macroblock. However, when upsampling, 9 horizontal pixels are used to produce the corresponding motion prediction block values because an upsampling filter requires more left and right pixels outside of the boundary for the filter to operate. Since the exemplary embodiment employs half pixel motion estimation, 17 pixels are needed to get 16 half pixels which are the average values of nearest two pixel samples. A half pixel interpolator performs the interpolation operation which provides the block of pixels with half-pixel resolution. Table 7A illustrates an exemplary mapping between subpixel positions and polyphase filter elements, and shows a number of left pixels which are needed in addition to the pixels in the upsampled block for the upsampling process.

TABLE 7A

| Sub Pixel Position | Polyphase | No. of Extra Left Pixels | Coordinate Change |
|---|---|---|---|
| 3:1 | 0 | 1 | 1 | x* -> x* - 1 |
| Upsampling | 1 | 2 | 1 | x* -> x* - 1 |
|  | 2 | 0 | 0 |  |
| 2:1 | 0 | 0 | 2 | x* -> x* - 2 |
| Upsampling | 1 | 1 | 2 | x* -> x* - 2 |

Figure 3B:
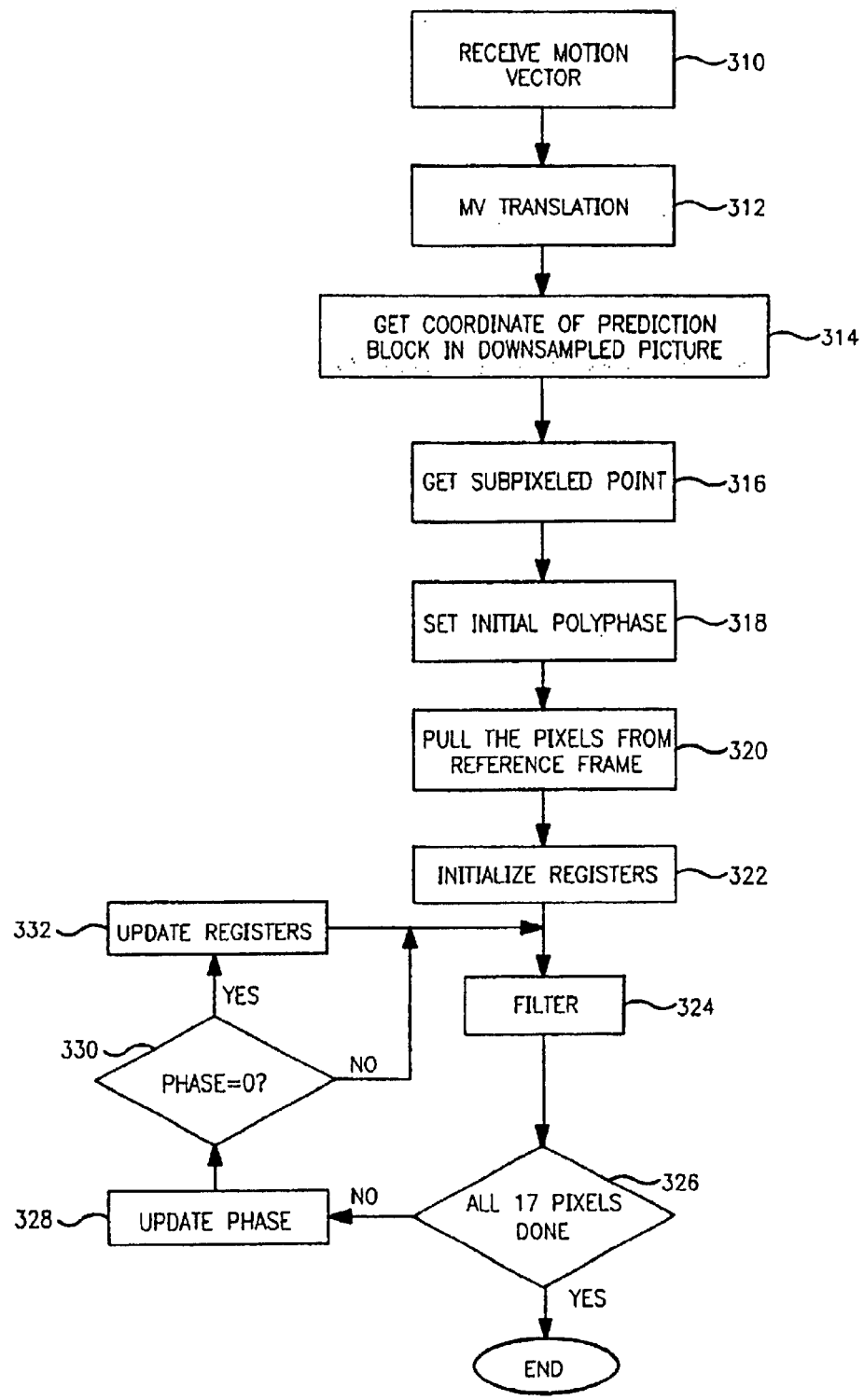
FIG. 3B is a flow-chart diagram which shows the upsampling process which is performed for each row of an input macroblock for an exemplary embodiment of the present invention.

FIG. 3B summarizes the upsampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to calculate the coordinates of the desired reference image half macroblock stored in memory 130. At step 316 the subpixel point for the half macroblock is determined and the initial polyphase filter values for upsampling are then determined at step 318. The identified pixels for the reference half macroblock of the stored downsampled reference frame are then retrieved from memory 130 at step 320. Before the first pass at the filtering step 324, the registers of the filter may be initialized at step 322, which, for the exemplary embodiment includes the step of loading the registers with the initial 3 or 5 pixel values. Then, after the filtering step 324, the process determines, at step 326, whether all pixels have been processed, which for the exemplary embodiment is 17 pixels. If all pixels have been processed, the upsampled block is complete. For an exemplary embodiment, a 17 by 9 pixel half macroblock is returned. The system returns upper or lower half macroblocks to allow for motion prediction decoding of both progressive scan and interlaced scan images. If all pixels have not been processed, the phase is updated at step 328, and the phase is checked, for the 0 value. If the phase is zero, the registers are updated for the next set of pixel values. Updating the phase at step 328 updates the phase value to 0, 1, and 2 for the filter loop period for exemplary 3:1 upsampling and to 0, and 1 for the filter loop period for 2:1 upsampling. Where the left-most pixel is outside of a boundary of the image picture, the first pixel value in the image picture may be repeated.

For an exemplary embodiment, the upsample filtering operation may be implemented in accordance with the following guidelines. First, several factors may be used: 1) the half-pixel motion prediction operation averages two full pixels, and corresponding filter coefficients are also averaged to provide the half-pixel filter coefficient; 2) a fixed number of filter coefficients, five for example, which may be equivalent to the number of filter taps, may be employed regardless of the particular downconversion; 3) five parallel input ports may be provided to the upsampling block for each forward and backward lower and upper block, with five input pixels LWR(0)–LWR(4) for each clock transition for each reference block being combined with corresponding filter coefficients to provide one output pixel, and 4) the sum of filter coefficients h(0)–h(4) combined with respective pixels LWR(0)–LWR(4) provide the output pixel of the sampling block.

Filter coefficients are desirably reversed because the multiplication ordering is opposite to the normal ordering of filter coefficients, and it may be desirable to zero some coefficients. Table 7B gives exemplary coefficients for the 3:1 upsampling filter, and Table 7C gives exemplary coefficients for the 2:1 upsampling filter:

TABLE 7B

|  | Sub-pixel 0 | Sub-pixel 1 | Sub-pixel 2 | Sub-pixel 3 | Sub-pixel 4 | Sub-pixel 5 |
|---|---|---|---|---|---|---|
| Filter Coeff. | 6 | -18 | -42 | -21 | 96 | 51 |
|  | 244 | 223 | 202 | 149 | 202 | 223 |
|  | 6 | 51 | 96 | 149 | -42 | -18 |
|  | 0 | 0 | 0 | -21 | 0 | 0 |
|  | 0 | 0 | 0 | 0 | 0 | 0 |
| Reference Phase | x*-1 01 | x*-1 00 | x*-1 10 | x*-1 01 | x* 00 | x* 10 |
| Half Pixel | 0 | 1 | 0 | 1 | 0 | 1 |

TABLE 7C

|  | Subpixel 0 | Subpixel 1 | Subpixel 2 | Subpixel 3 |
|---|---|---|---|---|
| Filter Coeff. | 3 | 2 | -37 | -17 |
|  | 7 | -15 | 165 | 86 |
|  | 236 | 200 | 165 | 200 |
|  | 7 | 86 | -37 | -15 |
|  | 3 | -17 | 0 | 2 |
| Reference Phase | x*-2 00 | x*-2 00 | x*-1 01 | x*-1 01 |
| Half Pixel | 0 | 1 | 0 | 1 |

In Tables 7B and 7C, x* is the downsampled pixel position defined in equations (1) and (2), and subpixel position, $x_s$, is redefined from equation (3) as equation (3')

$$x_s = (XH)\%(2Dx) \qquad (3')$$

For chrominance values of the exemplary implementation, XH is scaled by two and equations (1),(2) and (3') are applied. In one embodiment, phase and half pixel information (coded as two bits and one bit, respectively) is used by motion compensation processor 220 and half-pixel generator 228 of FIG. 2B. For example, reference block pixels are provided as U pixels first, V pixels next, and finally Y pixels. U and V pixels are clocked in for 40 cycles and Y pixels are clocked in for 144 cycles. Reference blocks may be provided for 3:1 decimation by providing the first five pixels, repeating twice, shifting the data by one, and repeating until a row is finished. The same method may be used for 2:1 decimation except that it is repeated once rather than twice. Input pixels are repeated since decimation follows addition of the output from motion compensation and half-pixel generation with the residual value. Consequently, for 3:1 decimation, two of three pixels are deleted, and dummy pixels for these pixel values do not matter.

3) DCT Domain Filtering Employing Weighting of DCT Coefficients

The exemplary embodiment of the present invention includes the DCT filter 216 of FIG. 2A processing the DCT coefficients in the frequency domain, which replaces a lowpass filter in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixel sample values. For example, a spatial filter having N taps may use as many as N additional multiplications and additions for each spatial pixel sample value. This compares to only one additional multiplication in the DCT domain filter.

The simplest DCT domain filter of the prior art is a truncation of the high frequency DCT coefficients. However, truncation of high frequency DCT coefficients does not result in a smooth filter and has drawbacks such as "ringing" near edges in the decoded picture. The DCT domain lowpass filter of the exemplary embodiment of the present invention is derived from a block mirror filter in the spatial domain. The filter coefficient values for the block mirror filter are, for example, optimized by numerical analysis in the spatial domain, and these values are then converted into coefficients of the DCT domain filter.

Although the exemplary embodiment shows DCT domain filtering in only the horizontal direction, DCT domain filtering can be done in either horizontal or vertical direction or both by combining horizontal and vertical filters.

4) Derivation of the DCT Domain Filter Coefficients

One exemplary filter of the present invention is derived from two constraints: first, that the filter process image data on a block by block basis for each block of the image without using information from previous blocks of a picture; and second, that the filter reduce the visibility of block boundaries which occur when the filter processes boundary pixel values.

According to the first constraint, in the DCT based compression of an MPEG image sequence, for example, N×N DCT coefficients yield N×N spatial pixel values. Consequently, the exemplary embodiment of the present invention implements a DCT domain filter which only processes a current block of the received picture.

According to the second constraint, if the filter is simply applied to a block of spatial frequency coefficients, there is a transition of the filtering operation at the block boundary which is caused by an insufficient number spatial pixel values beyond the boundary to fill the residual of the filter. That is to say, coefficient values at the edge of a block cannot be properly filtered because the N-tap filter has values for only N/2 taps, the remaining values are beyond the boundary of the block. Several methods of supplying the missing pixel values exist: 1) repeat a predetermined constant pixel value beyond a boundary; 2) repeat the same pixel value as the boundary pixel value; and 3) mirror the pixel values of the block to simulate previous and subsequent blocks of pixel values adjacent to the processed block. Without prior information on the contents of the previous or subsequent block, the mirroring method of repeating pixel values is considered as a preferred method. Therefore, one embodiment of the present invention employs this mirroring method for the filter and is termed a "block mirror filter."

The following describes an exemplary embodiment whic block mirror filter that lowpass filters 8 input spatial pixel sample values of a block. If the size of input block is an 8×8 block matrix of pixel sample values, then a horizontal filtering can be done by applying the block mirror filter to each row of 8 pixel sample values. It will be apparent to one skilled in the art that the filtering process can be implemented by applying the filter coefficients columnwise to the block matrix, or that multidimensional filtering may be accomplished by filtering the rows and then filtering the columns of the block matrix.

Figure 4:
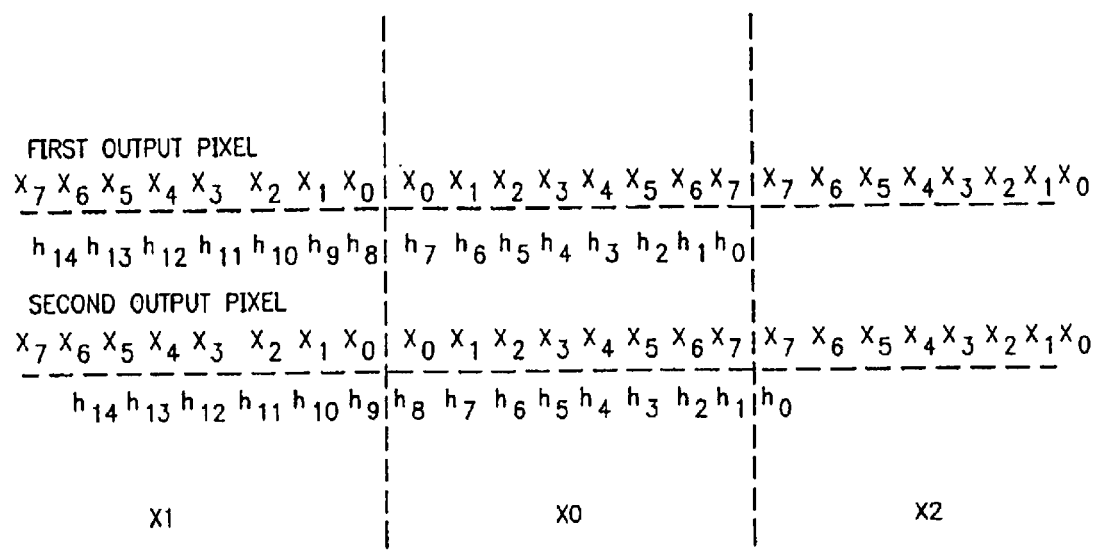
FIG. 4 is a pixel chart which illustrates the multiplication pairs for the first and second output pixel values of an exemplary embodiment of a block mirror filter.

FIG. 4 shows an exemplary correspondence between the input pixel values $x_0$ through $x_7$ (group X0) and filter taps for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filer tap coefficient values with the corresponding pixel sample values. FIG. 4 illustrates the multiplication pairs for the first and second output pixel values.

The following shows that the block mirror filter in the spatial domain is equivalent to DCT domain filter. The mirror filtering is related to a circular convolution with 2N points (N=8).

Define the vector x' as shown in equation (4).

$$x'(n)=x(n)+x(2N-1-n);\ 0<=n<=2N-1 \qquad (4)$$

In the case of N=8, $$x'=(x0, x1, x2, x3, x4, x5, x6, x7, x7, x6, x5, x4, x3, x2, x1, x0)$$

Rearranging the filter tap values $h_0$ through $h_{14}$, and denoting the rearranged values by h'

$$h'=(h7, h8, h9, h10, h11, h12, h13, h14, 0, h0, h1, h2, h3, h4, h5, h6)$$

Therefore, the mirror filtered output y(n) is a circular convolution of x'(n) and h'(n) which is given by equation (5).

$$y(n)=x'(n)\otimes h'(n) \qquad (5)$$

Which is equivalent to equation (6).

$$y(n) = \sum_{k=0}^{2N-1} x'[n-k] \cdot h'(n) \qquad (6)$$

where x'[n−k] is a circular modulo of x'(n) and $$x'[n]=x'(n) \text{ for } n>=0$$

$$x'[n]=x'(n+2N) \text{ for } n<0.$$

The circular convolution in the spatial domain shown in equation (5) corresponds to the scalar multiplication in the Discrete Fourier Transform (DFT) domain. Defining Y(k) as the DFT of y(n), then equation (5) becomes equation (7) in the DFT domain.

$$Y(k)=X'(k) \cdot H'(k) \qquad (7)$$

where X'(k) and H'(k) are the DFTs of x'(n) and h'(n) respectively.

Equations (4) through (7) are valid for a filter with a number of taps less than 2N. In addition, the filter is limited to be a symmetric filter with an odd number of taps, with these constraints H'(k) is a real number. Therefore, X'(k), the DFT of x'(n), can be weighed with a real number H'(k) in the DFT frequency-domain instead of 2N multiplication and 2N addition operations in the spatial domain to implement the filtering operation. The values of X'(k) are very closely related to the DCT coefficients of the original N-point x(n), because an N-point DCT of x(n) is obtained by the 2N-point DFT of x'(n) which is the joint sequence composed of x(n) and its mirror, x(2N−1−n).

The following describes the derivation of the DFT coefficients of the spatial filter, H'(k), by assuming a symmetric filter having an odd number of taps, 2N−1, which is h(n)= h(2N−2−n), and equivalently h'(n)=h'(2N−n) and h'(N)=0. Define H'(k) as in equation (8).

$$H'(k) = \sum_{n=0}^{2N-1} h'(n) \cdot W_{2N}^{kn} = h'(0) + 2\sum_{n=1}^{N-1} h'(n) \cdot \cos\frac{\pi kn}{N} \qquad (8)$$

where $W_{2N}^{kn}=\exp\{-2\pi kn/(2N)\}$; and H'(k)=H'(2N−k).

The inventor has determined that the 2N-point DFT of x'(n), X'(k), can be expressed by its DCT coefficients as shown in equation (9).

$$X'(k) = \sum_{n=0}^{2N-1} x'(n) \cdot W_{2N}^{kn} = W_{2N}^{-k/2} \cdot \sum_{n==}^{N-1} 2x(n) \cdot \cos\frac{\pi k(2n+1)}{2N} \quad (9)$$

whereas the DCT coefficient of x (n), C(k), is given by equation (10).

$$C(k) = \sum_{n=1}^{N-1} 2x(n) \cdot \cos\frac{\pi k(2n+1)}{2N} = W_{2N}^{k/2} \cdot X'(k) \text{ for } 0 \le k \le N-1 \quad (10)$$

and C(k)=0 elsewhere.

The values of X'(k), the DFT coefficients of x'(n), can be expressed by C(k), the DCT coefficients of x'(n) by the matrix of equation (11).

$$X'(k) = \begin{bmatrix} W_{2N}^{-k/2} \cdot C(k) & \text{for} & k \le N-1 \\ 0 & \text{for} & k = N \\ -W_{2N}^{-k/2} & \text{for} & N+1 \le k \le 2N-1 \end{bmatrix} \quad (11)$$

The original spatial pixel sample values, x(n), can be also obtained by IDCT (Inverse Discrete Cosine Transformation) shown in equation (12).

$$x(n) = \frac{1}{N}\sum_{k=0}^{N-1} \alpha(k) \cdot C(k) \cdot \cos\frac{\pi k(n+1/2)}{N} \quad (12)$$

where α(k)=1/2 for k=0 and 1 otherwise. The values of y(n) for 0<=n<N−1, are obtained by IDFT of X'(k)H'(k) given in (13):

$$y(n) = \frac{1}{2N} \cdot \left\{ \sum_{k=0}^{2N-1} X'(k) \cdot H'(k) \cdot W_{2N}^{-kn} \right\} \quad (13)$$

$$= \frac{1}{2N} \cdot \left\{ \sum_{k=0}^{N-1} C(k) \cdot H'(k) \cdot W_{2N}^{-k(n+1/2)} + \sum_{k=N+1}^{2N-1} -C(2N-k) \cdot H'(2N-k) \cdot W_{2N}^{-k(n+1/2)} \right\}$$

$$= \frac{1}{N}\sum_{k=0}^{N-1} \alpha(k) \cdot \{C(k) \cdot H'(k)\} \cdot \cos\frac{\pi k(n+1/2)}{N}$$

The values y(n) of equation (13) are the spatial values of the IDCT of C(k)H'(k). Therefore, the spatial filtering can be replaced by the DCT weighting of the input frequency-domain coefficients representing the image block with H'(k) and then performing the IDCT of the weighted values to reconstruct the filtered pixel values in the spatial domain.

One embodiment of the exemplary block mirror filtering of the present invention is derived as by the following steps: 1) a one dimensional lowpass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT coefficients are multiplied with the real number DFT coefficients of the filter; and 6) an inverse discrete cosine transform (IDCT) of the filtered DCT coefficients is performed to provide a block of lowpass-filtered pixels prepared for decimation.

The cutoff frequency of the lowpass filter is determined by the decimation ratio. For one exemplary embodiment, the cutoff frequency is π/3 for a 3:1 decimation and π/2 for a 2:1 decimation, where π corresponds to one-half of sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter is required. Therefore, a separate DCT domain filter block multiplication is not physically required in a particular implementation; another embodiment of the present invention simply combines the DCT domain filter coefficients with the IDCT processing coefficients and applies the combined coefficients to the IDCT operation.

For the exemplary down conversion system of the present invention, the horizontal filtering and decimations of the DCT coefficients were considered; and the following are two exemplary implementations for:

1. 1920H by 1080V interlace to 640 by 1080 interlace conversion (Horizontal 3:1 decimation).
2. 1280H by 720V progressive to 640 by 720 progressive conversion (Horizontal 2:1 Decimation)

Table 8 shows the DCT block mirror filter (weighting) coefficients; in Table 8 the numbers in the parenthesis are 10 bit 2's complementary representations. The "*" of Table 8 indicates an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 8

| | 3:1 Decimation | 2:1 Decimation |
|---|---|---|
| H[0] | 1.000000000000000 (511) | 1.0000000000000000 (511) |
| H[1] | 0.986934590759779 (505) | 1.0169628157945179 (*) |
| H[2] | 0.790833583171840 (405) | 1.000000000000000 (511) |
| H[3] | 0.334720213357461 (171) | 0.82247656390475166 (421) |
| H[4] | −0.0323463361027473 (−17) | 0.46728234862006007 (239) |
| H[5] | −0.0377450036954524 (−19) | 0.10634261847436199 (54) |
| H[6] | −0.0726889747390758 (37) | −0.052131780559049545 (−27) |
| H[7] | 0.00954287167337307 (5) | −0.003489737967467715 (−2) |

These horizontal DCT filter coefficients weight each column in the 8×8 block of DCT coefficients of the encoded video image. For example, the DCT coefficients of column zero are weighted by H[0], and the DCT coefficients of the first column are weighted by H[1] and so on.

The above description illustrates a horizontal filter implementation using one-dimensional DCTs. As is known in the digital signal processing art, such processing can be extended to two-dimensional systems. Equation (12) illustrates the IDCT for the one-dimensional case, consequently, equation (12') gives the more general two dimensional IDCT:

$$f(x,y) = \frac{2}{N}\sum_{u=0}^{N-1}\sum_{v=0}^{N-1} C(u)C(v)F(u,v)\cos\frac{(2x+1)u\pi}{2N}\cos\frac{(2y+1)v\pi}{2N} \quad (12')$$

$$\text{where } C(u), C(v) \text{ are } \begin{cases} \frac{1}{\sqrt{2}} & u,v = 0 \\ 1 & \text{otherwise} \end{cases}$$

where f(x,y) is the spatial domain representation, x and y are spatial coordinates in the sample domain, and u,v are the coordinates in the transform domain. Since the coefficients C(u), C(v) are known, as are the values of the cosine terms, only the transform domain coefficients need to be provided for the processing algorithms.

For a two-dimensional system, the input sequence is now represented as a matrix of values, each representing the respective coordinate in the transform domain, and the matrix may be shown to have sequences periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

Figure 5:
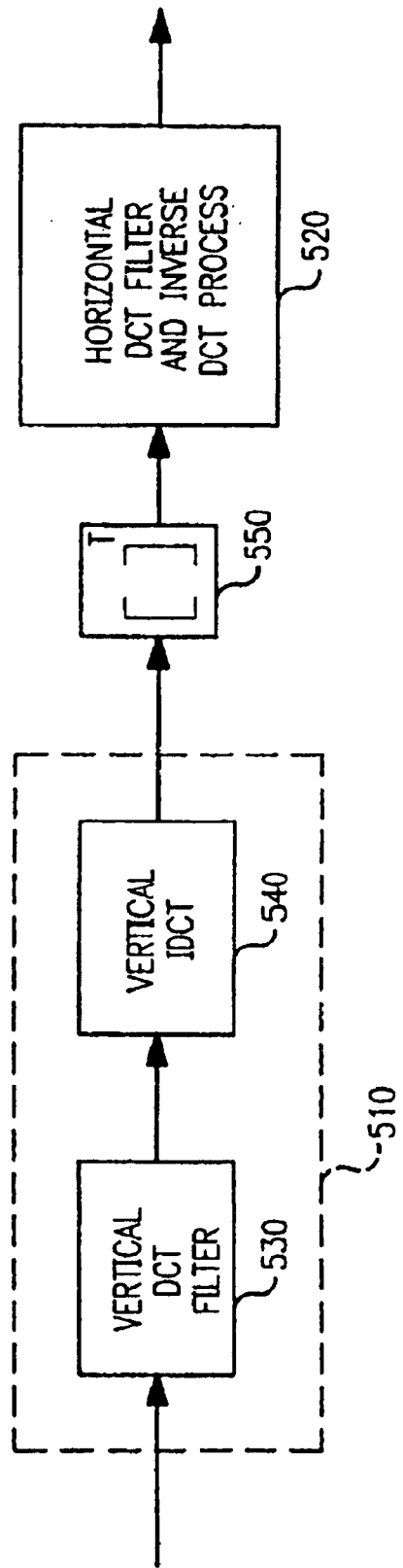
FIG. 5 is a block diagram which illustrates an exemplary implementation of the filter for down-conversion for a two-dimensional system processing the horizontal and vertical components implemented as cascaded one-dimensional IDCTs.

FIG. 5 shows an exemplary implementation of the filter for down-conversion for a two-dimensional system processing the horizontal and vertical components implemented as cascaded one-dimensional IDCTs. As shown in FIG. 5, the DCT Filter Mask 216 and IDCT 218 of FIG. 2 may be implemented by a Vertical Processor 510, containing a Vertical DCT Filter 530 and a Vertical IDCT 540, and a Horizontal Processor 520, containing a horizontal DCT Filter and horizontal IDCT which are the same as those implemented for the vertical components. Since the filtering and IDCT processes are linear, the order of implementing these processes can be rearranged (e.g., horizontal and vertical DCT filtering first and horizontal and vertical IDCTs second, or vise-versa, or Vertical Processor 520 first and Horizontal Processor 510 (second)).

In the particular implementation shown in FIG. 5, the Vertical Processor 510 is followed by a block Transpose Operator 550, which switches the rows and columns of the block of vertical processed values provided by the Vertical Processor. This operation may be used to increase the efficiency of computation by preparing the block for processing by the Horizontal Processor 520.

The encoded video block, for example an 8×8 block of matrix values, is received by the Vertical DCT filter 530, which weights each row entry of the block by the DCT filter values corresponding to the desired vertical decimation. Next, the Vertical IDCT 540 performs the inverse DCT for the vertical components of the block. As described previously, since both processes simply perform a matrix multiplication and addition, the DCT LPF coefficients can be combined with the vertical DCT coefficients for matrix multiplications and addition operations. The Vertical Processor 510 then provides the vertically processed blocks to the Transpose Operator 550, which provides the transposed block of vertically processed values to the Horizontal Processor 520. The Transpose Operator 550 is not necessary unless the IDCT operation is only done by row or by column. The Horizontal Processor 520 performs the weighting of each column entry of the block by the DCT filter values corresponding to the desired horizontal filtering, and then performs the inverse DCT for the horizontal components of the block.

As described with reference to equation (12'), only coefficients in the transform domain are provided to the processing algorithms; and the operations are linear which allows mathematical operations on these coefficients only. The operations for the IDCT, as is readily apparent from equation (12'), form a sum of products. Consequently, a hardware implementation requires known coefficients to be stored in memory, such as a ROM (not shown), and a group of multiply and add circuits (not shown) which receives these coefficients from the ROM as well as selected coefficients from the matrix of input transform coordinates. For more advanced systems, a ROM-accumulator method may be used if the order of mathematical operations is modified according to distributed arithmetic to convert from a sum of products implementation to a bit-serial implementation. Such techniques are described in, for example, Stanley A. White, Applications of Distributed Arithmetic to Digital Signal Processing: A Tutorial Review, IEEE ASSP Magazine, July, 1989, which take advantage of symmetries in the computations to reduce a total gate count of the sum of products implementation.

In an alternative embodiment of the present invention, the DCT filter operation may be combined with the inverse DCT (IDCT) operation. For such an embodiment, since the filtering and inverse transform operations are linear, the filter coefficients may be combined with the coefficients of the IDCT to form a modified IDCT. As is known in the art, the modified IDCT, and hence the combined IDCT and DCT downconversion filtering, may be performed through a hardware implementation similar to that of the simple IDCT operation.

c) Memory Subsystem

1) Memory Access and Storage of Bitstream and Picture Data

Figure 12:
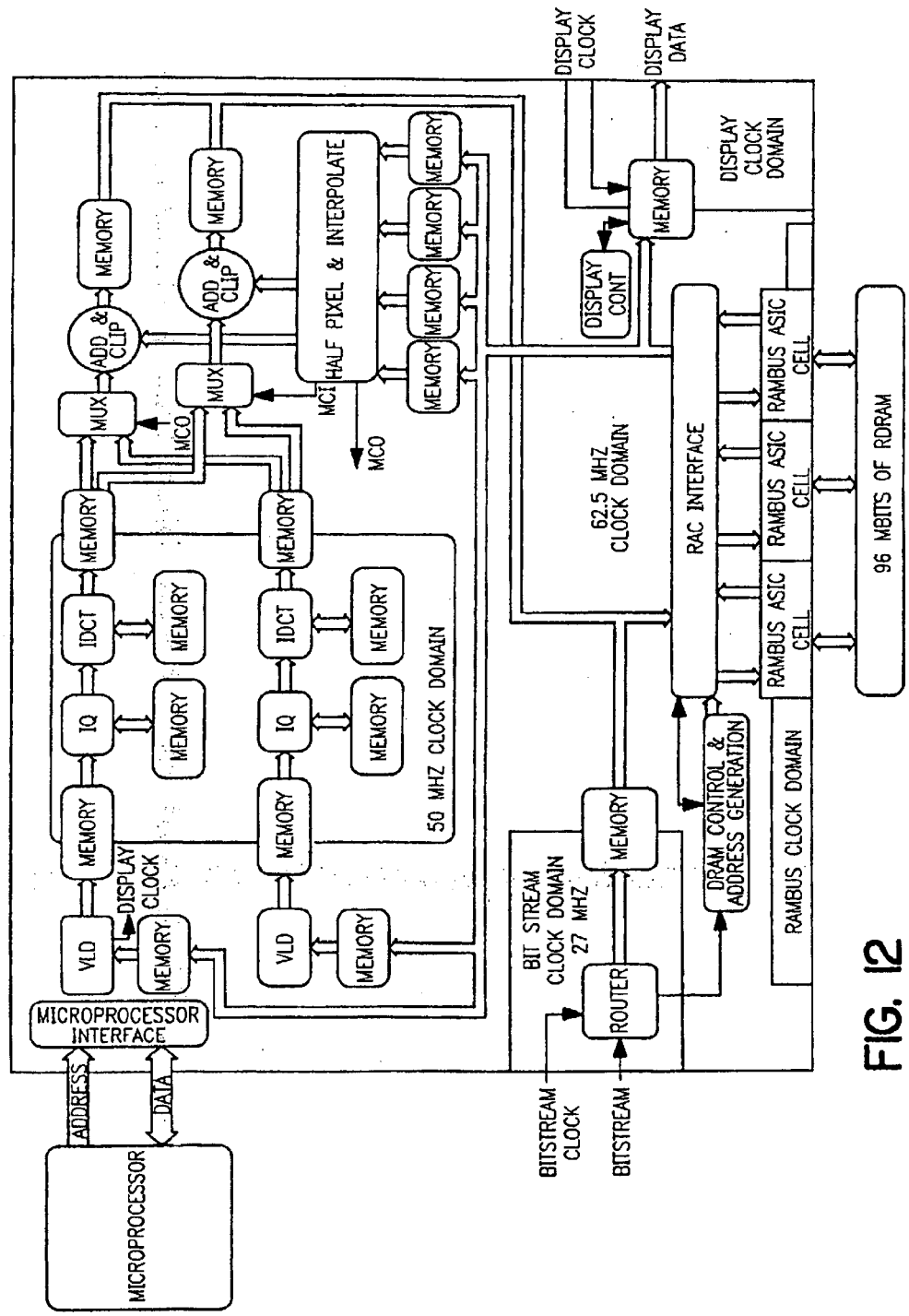
FIG. 12 is a high level block diagram of the video decoder having high bandwidth memory as employed by an exemplary embodiment of the present invention to decode ATSC video signals.

As shown in FIG. 1B, the exemplary embodiment of the present invention employs an ATV Video Decoder 121 having a Memory Subsystem 174 which controls the storage and reading of information to and from Memory 130. Memory Subsystem 174 provides picture data and bitstream data to Memory 130 for video decoding operations, and in the preferred embodiment, at least 2 pictures, or frames, are used for proper decoding of MPEG-2 encoded video data. An optional On-Screen Display (OSD) section in the Memory 130 may be available to support OSD data. The interface between the Memory Subsystem 174 and Memory 130 may be a Concurrent RDRAM interface providing a 500 Mbps channel, and three RAMBUS channels may be used to support the necessary bandwidth. An embodiment of the present invention having Picture processor 171, Macroblock decoder 172, and Memory subsystem 174 operating with external memory 130 may employ a system as described in U.S. Pat. No. 5,623,311 entitled MPEG VIDEO DECODER HAVING A HIGH BANDWIDTH MEMORY to Phillips et al., which is incorporated herein by reference. FIG. 12 is a high level block diagram of such system of a video decoder having high bandwidth memory as employed by an exemplary embodiment of the present invention to decode MP@ML MPEG-2 pictures.

In summary, and described with relation to FIG. 1A and FIG. 1B, U.S. Pat. No. 5,623,311 describes a single, high bandwidth memory having a single memory port. The memory 130 holds input bitstream, first and second reference frames used for motion compensated processing, and image data representing the field currently being decoded. The decoder includes 1) circuitry (picture processor 171) which stores and fetches the bitstream data, 2) circuitry that fetches the reference frame data and stores the image data for the currently decoded field in block format (Macroblock decoder 172), and fetches the image data for conversion to raster-scan format (display section 173). The memory operations are time division multiplexed using a single common memory port with a defined memory access time period, called Macroblock Time (MblkT) for control operations. A digital phase locked loop (DPLL) 122 counts pulses of a 27 MHz system clock signal, defined in the MPEG-2 standard, to generate a count value. The count value is compared to a succession of externally supplied system clock reference (SCR) values to generate a phase difference signal that is used to adjust the frequency of the signal produced by the digital phase locked loop.

Table 9 summarizes the picture storage requirements for DC configurations to support multiple formats:

TABLE 9

| Format | Pixels (H) | Macro-blocks (H) | Pixels (V) | Macro-blocks (V) | Bits per Picture | Storage (3 Pictures) |
|---|---|---|---|---|---|---|
| 1920 x 1088 DC | 640 | 40 | 1088 | 68 | 8,355,840 | 25,067,520 |
| 1280 X 720 DC | 640 | 40 | 720 | 45 | 5,529,600 | 16,588,800 |
| 704 x 480 | 704 | 44 | 480 | 30 | 4,055,040 | 12,165,120 |
| 640 x 480 | 640 | 40 | 480 | 30 | 3,686,400 | 12,165,120 |

For DC mode, 1920×1080 pictures are reduced by a factor of 3 horizontally, yielding a 640×1080 picture; 1280×720 pictures are reduced by a factor of 2 horizontally yielding a 640×720 picture. The 704×480 and 640×480 pictures are not required to be reduced in DC mode.

Accommodating multiple DC pictures in Memory 130 also requires supporting respective decoding operations according to corresponding picture display timing. For example, progressive pictures occur at twice the rate of interlaced pictures (60 or 59.94 Hz progressive vs. 30 or 29.97 Hz interlace) and, as a result, progressive pictures are decoded faster than interlaced pictures (60 or 59.94 Frames per second progressive vs. 30 or 29.97 Frames per second interlace). Consequently, the decoding rate is constrained by the display rate for the format, and if the less stringent 59.97 or 29.97 frames per second decoding rates are used rather than the 60 or 30 frames per second, one frame out of every 1001 frames may be dropped from the conversion. For convenience, decoding operations for a format may be measured in units of "Macroblock Time" (MblkT) defined as the period during which all decoding operations for a macroblock may be completed (clock cycles per macroblock decoding). Using this period as a measure, as defined in equation 14, control signals and memory access operations can be defined during the regularly occurring MblkT period.

MblkT (clock cycles/macroblock)=system clock rate (clock cycles/sec.)/Frame rate (frames/sec.)/
Picture Size (macroblocks/frame)   (14)

In addition, a blanking interval may not be used for picture decoding of interlaced pictures, and an 8-line margin to the time period is added to account for decoding 8 lines simultaneously (interlaced) and 16 lines simultaneously (progressive). Therefore, an adjustment factor (AdjFact) may be added to the MblkT, as given in equations (15) and (16).

AdjFact (interlace)=(total lines−vertical blank lines−8)/total lines   (15)

AdjFact (progressive)=(total lines−16)/total lines   (16)

Table 10 lists MblkT for each of the supported formats:

TABLE 10

| Format | Mblk per frame | Frame Time (msec) | MblkT (clks) | Adjustment factor | Active Decoding MblkT |
|---|---|---|---|---|---|
| 1920 x 1080 | 8160 | 33.33 | 255.3 | 0.9729 | 248.4 |
| 1280 x 720 | 3600 | 16.67 | 289.4 | 0.9787 | 283.2 |
| 704 x 480 P | 1320 | 16.67 | 789.1 | 0.9695 | 765.1 |
| 704 x 480 I | 1320 | 33.33 | 1578 | 0.9419 | 1486.6 |
| 640 x 480 P | 1200 | 16.67 | 868 | 0.9695 | 841.6 |
| 640 x 480 I | 1200 | 33.33 | 1736 | 0.9419 | 1635.3 |

In an exemplary embodiment of the present invention, a MblkT of 241 clocks is employed for all formats to meet the requirement of the fastest decode time including a small margin. For such chosen MblkT period, slower format decoding includes periods in which no decoding activities occur; consequently, a counter may be employed to reflect the linear decoding rate with a stall generated to stop decoding in selected MblkT intervals.

Referring to FIG. 1B, the Memory Subsystem 174 may provide internal picture data interfaces to the Macroblock decoder 172 and display section 173. A decoded macroblock interface accepts decoded macroblock data and stores it in correct memory address locations of Memory 130 according to a memory map defined for the given format. Memory addresses may be derived from the macroblock number and picture number. The macroblocks may be received as a macroblock row on three channels, one channel per 16 Mb memory device (131–136 of FIG. 1A) at the system clock rate. Each memory device may have two partitions for each picture, each partition using an upper and lower address. For interlaced pictures, the one partition carries Field 0 data and the other partition carries Field 1 data, and for progressive pictures, both upper and lower partitions are treated as a single partition and carry data for the entire frame. Every macroblock is decoded and stored for every picture, except for 3:2 pull down mode where decoding is paused for an entire field time period. In 3:2 pulldown mode, a signal having a frame rate of 24 frames per second is displayed at 60 frames (or fields) per second by displaying one frame twice and the next frame three times.

A reference macroblock interface supplies stored, previously decoded picture data to the macroblock decoder 172 for motion compensation. The interface may supply two, one or no macroblocks corresponding to bidirectional predictive (B) encoding, uni-directional predictive (P) encoding or intra (I) encoding. Each reference block is supplied using two channels, and each channel contains one-half of a macroblock. For DC mode employing a decimation factor of 2, each retrieved half macroblock is 14×9 (Y), 10×5 ($C_R$) and 10×5 ($C_B$) to allow for up-sampling and half-pixel resolution.

A display interface provides retrieved pixel data to the display section 173, multiplexing Y, $C_R$, and $C_B$ pixel data on a single channel. Two display channels may be provided to support conversion from/to interlaced to/from progressive formats. In DC mode, a first channel may provide up to 4 lines of interlaced or progressive data simultaneously and a second channel may provide up to 4 lines of interlaced data.

Figure 6A:
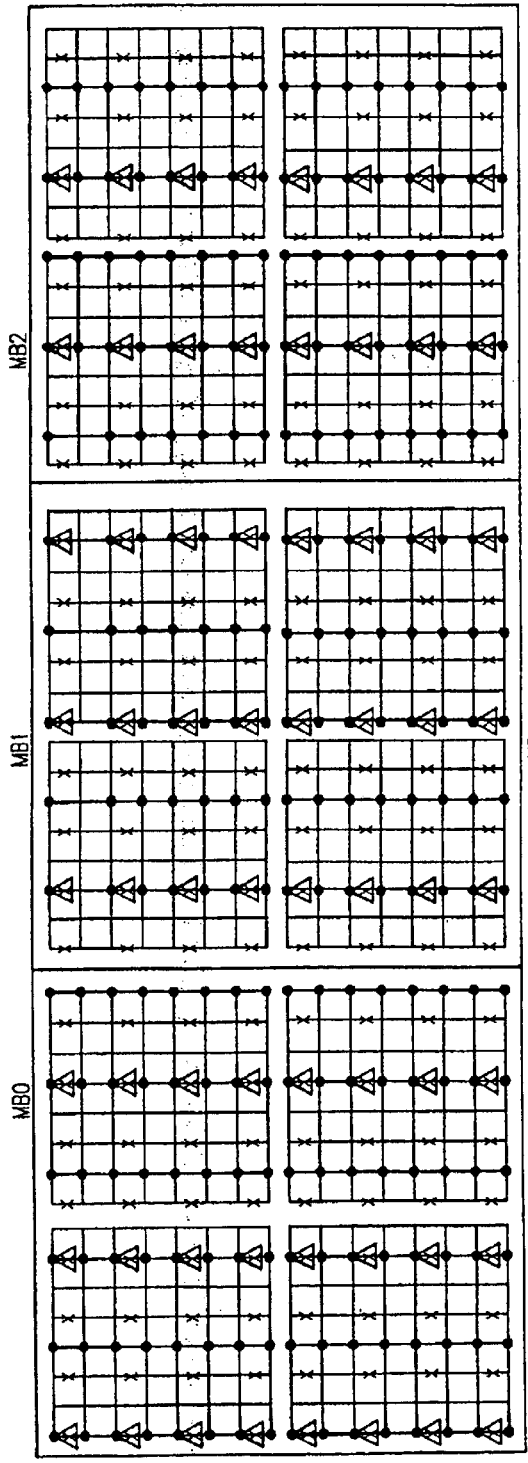
FIG. 6A is a macroblock diagram which shows the input and decimated output pixels for 4:2:0 video signal using 3:1 decimation.
Figure 6B:
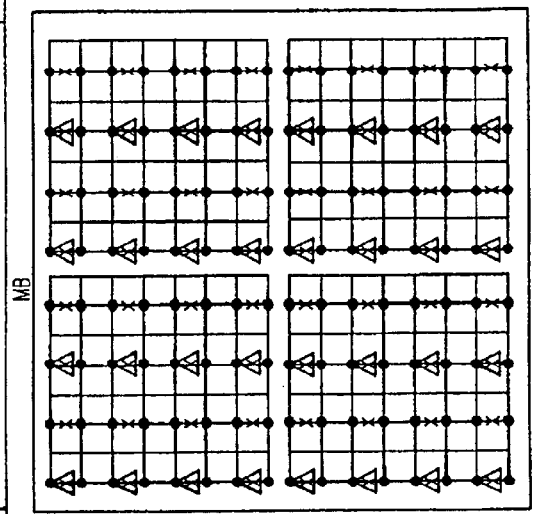
FIG. 6B is a pixel block diagram which shows the input and decimated output pixels for 4:2:0 video signal using 2:1 decimation.
Figure 6C:
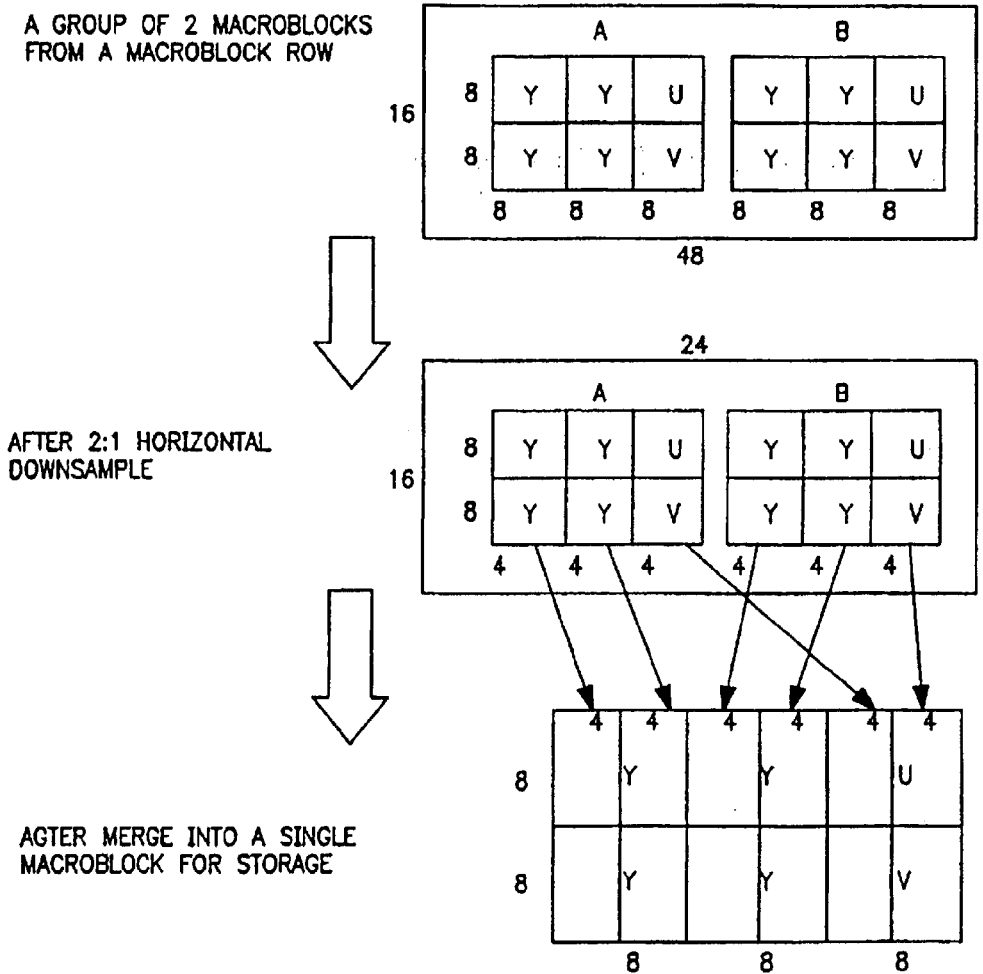
FIG. 6C is a macroblock diagram which illustrates a merging process of two macroblocks into a single macroblock for storage in memory for downconversion by 2 horizontally.
Figure 6D:
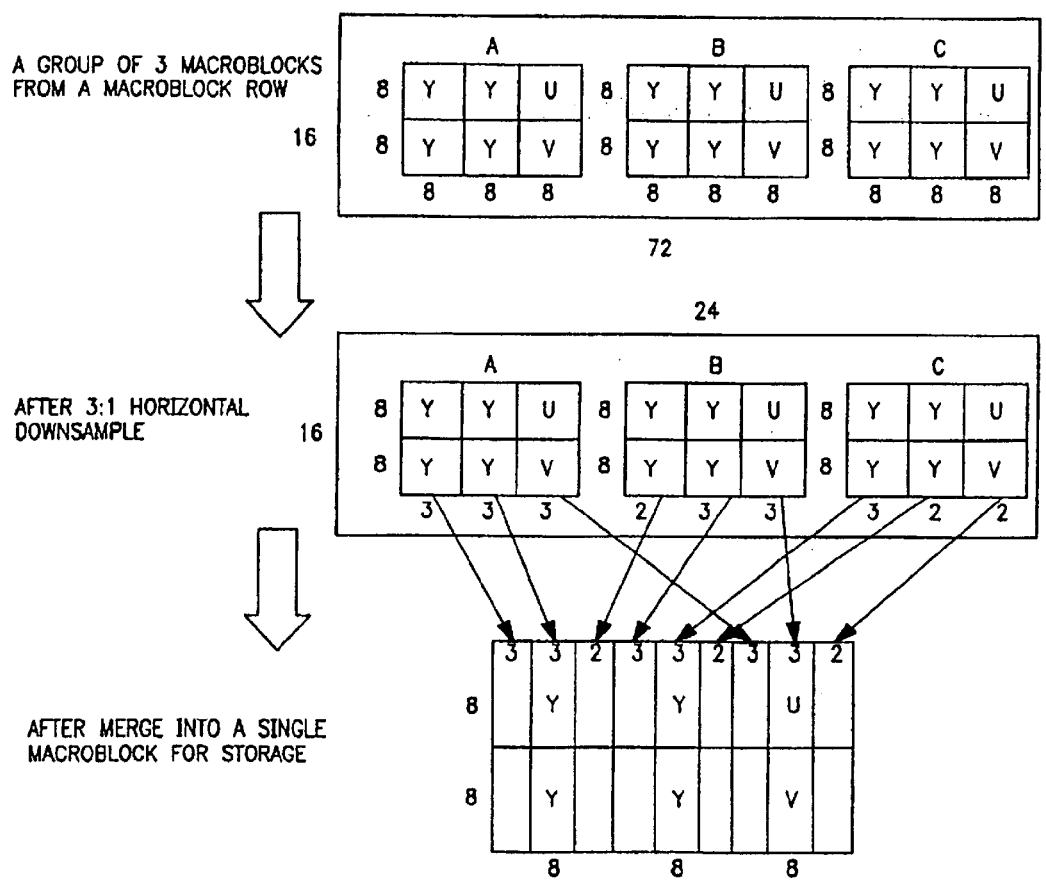
FIG. 6D is a macroblock diagram which illustrates a merging process of three macroblocks into a single macroblock for storage in memory for downconversion by 3 horizontally.

For downconversion, downsampled macroblocks are merged into a single macroblock for storage. The downsampling process of the DC mode is described subsequently with reference to FIG. 6A and FIG. 6B. FIG. 6C illustrates a merging process of two macroblocks into a single macroblock for storage in memory 130 for downconversion by 2 horizontally. FIG. 6D illustrates a merging process of three macroblocks into a single macroblock for storage in memory 130 for downconversion by 3 horizontally.

d) Downsampling and Display Conversion of the Display Section

1) Down Sampling for Low Resolution Formats

Down sampling is accomplished by the Down Sampling process 232 of FIG. 2B to reduce the number of pixels in the downconverted image. FIG. 6A shows the input and decimated output pixels for a 4:2:0 signal format for 3:1 decimation. FIG. 6B shows the input and decimated output pixels for 4:2:0 chrominance type 2:1 decimation. Table 11 gives the legend identification for the Luminance and Chrominance pixels of FIG. 6A and FIG. 6B. The pixel positions before and after the down conversion of FIGS. 6A and 6B are the interlaced (3:1 decimation) and progressive (2:1 decimation) cases respectively.

TABLE 11

| Symbol | Pixel |
|---|---|
| + | Luminance Before Decimation |
| x | Chrominance Before Decimation |
| • | Luminance After decimation |
| Δ | Chrominance After Decimation |

For down sampling of the interlaced image, which may be the conversion from a 1920 by 1080 pixel image to a 640 by 1080 pixel horizontally compressed image, two out of every three pixels are decimated on the horizontal axis. For the exemplary 3:1 decimation, there are three different macroblock types after the down conversion process. In FIG. 6A, original macroblocks were denoted by MB0, MB1, MB2. The down sampled luminance pixels in MB0 start at the first pixel in the original macroblock, but in MB1 and MB2 the down-sampled pixels start at the third and the second pixels. Also the number of down-sampled pixels in each macroblock are not the same. In MB0, there are 6 down-sampled pixels horizontally, but 5 pixels in MB1 and MB2. These three MB types are repeating, therefore Modulo 3 arithmetic is to be applied. Table 12 summarizes the number of downsampling pixels and offsets for each input macroblock MB0, MB1,

TABLE 12

| | MB0 | MB1 | MB2 |
|---|---|---|---|
| No. of Down Sampled Luminance Pixels | 6 | 5 | 5 |
| No. of Down Sampled Chrominance Pixels | 3 | 3 | 2 |
| Offset of 1st Down Sampled Luminance Pixel | 0 | 2 | 1 |
| Offset of 1st Down Sampled Chrominance Pixel | 0 | 1 | 2 |

For downsampling of the progressive format image the luminance signal is subsampled for every second sample horizontally. For the chrominance signal, the down-sampled pixel has a spatial position that is one-half pixel below the pixel position in the original image.

2) Display Conversion

Figure 11A:
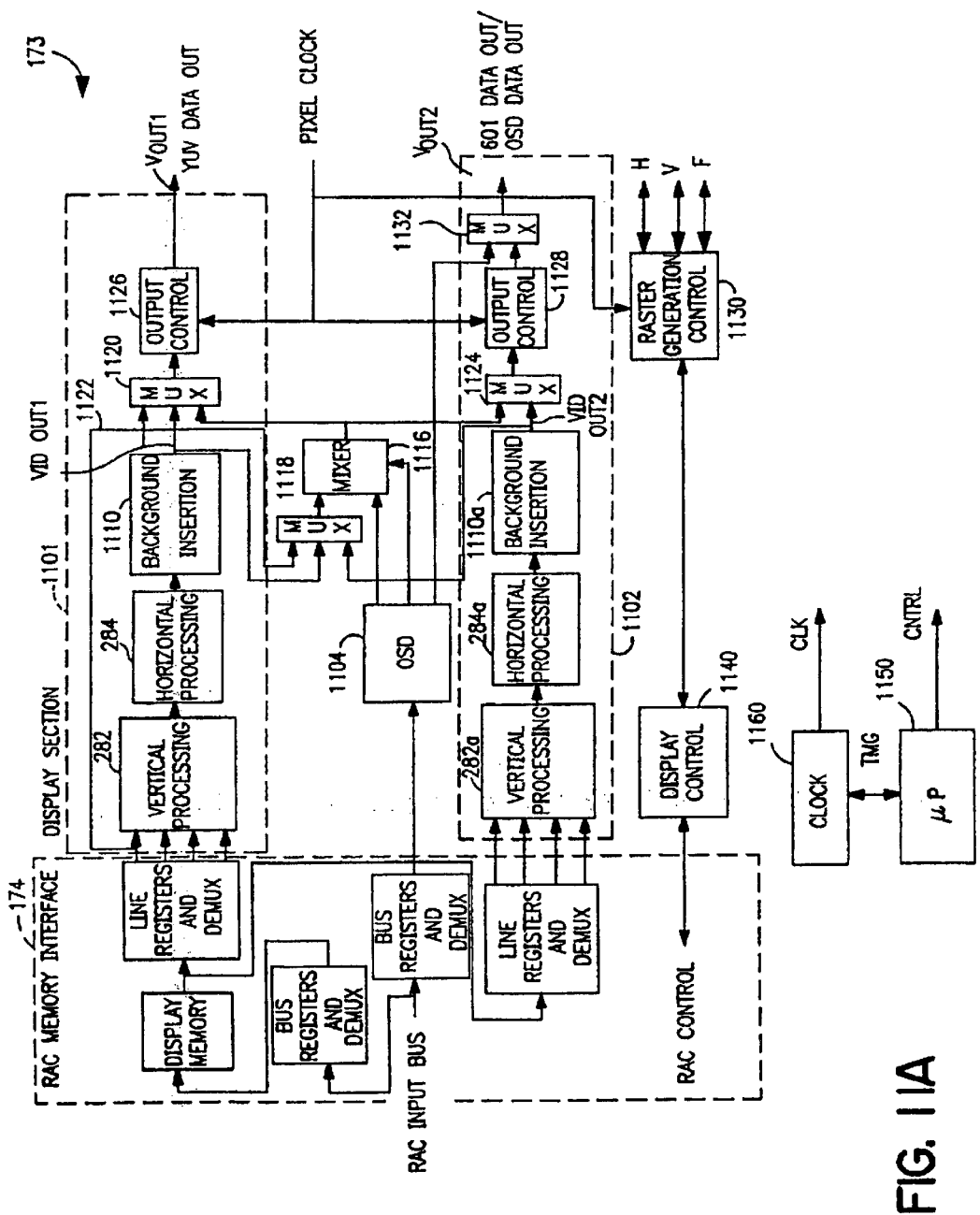
FIG. 11A is a high level block diagram illustrating the display section of the ATV Video Decoder of an exemplary embodiment of the present invention.

The display section 173 of the ATV Decoder 121 of FIG. 1B is used to format the stored picture information (the decoded picture information) for a particular display format. FIG. 11A is a high level block diagram illustrating the display section of the ATV Video Decoder 121 for an exemplary embodiment of the present invention.

Referring to FIG. 11A, two output video signals are supported, a first output signal $VID_{out1}$ which supports any selected video format, and a second output signal $VID_{out2}$ which supports 525I (CCIR-601) only. Each output signal is processed by separate sets of display processing elements 1101 and 1102, respectively, which perform horizontal and vertical upsampling/downsampling. This configuration may be preferred when the display aspect ratio does not match the aspect ratio of the input picture. An optional On Screen Display (OSD) section 1104 may be included to provide on screen display information to one of the supported output signals $VID_{out1}$ and $VID_{out2}$ to form display signals $V_{out1}$ or $V_{out2}$. All processing is performed at the internal clock rate except for control of the output signals $V_{out1}$ or $V_{out2}$ at Output Controllers 1126 and 1128, which is done at the pixel clock rate. For the preferred embodiment, the pixel clock rate may be at the luminance pixel rate or at twice the luminance pixel rate.

Because the display sets of processing elements 1101 and 1102 operate similarly, only the operation of the display processing set 1101 is described. Referring to the display processing set 1101, four lines of pixel data are provided from the memory 130 (shown in FIG. 1A) to the vertical processing block 282 (shown in FIG. 2B) in raster order. Each line supplies $C_R,Y,C_B,Y$ data 32 bits at a time. Vertical Processing block 282 then filters the four lines down to one line and provides the filtered data in 32 bit $C_RYC_BY$ format to horizontal processing block 284 (also shown in FIG. 2B). The horizontal processing block 284 provides the correct number of pixels for the selected raster format as formatted pixel data. Consequently, the filtered data rate entering the horizontal processing block 284 is not necessarily equal to the output data rate. In an upsampling case, the input data rate will be lower than the output data rate. In a down sampling case, the input data rate will be higher than the output data rate. The formatted pixel data may have background information inserted by optional background processing block 1110.

As would be known to one skilled in the art, the elements of the display section 173 are controlled by a controller 1150, which is set up by parameters read from and written to the microprocessor interface. The controller generates signal CNTRL, and such control is necessary to coordinate and to effect proper circuit operation, loading and transfer of pixels, and signal processing.

Data from the horizontal processing block 284, data from a second horizontal processing block 284$_a$, and HD (non processed) Video data on HD Bypass 1122 are provided to Multiplexer 118 which selects, under processor control (not shown), one video data stream which is provided to mixer 116 to combine the video data stream and optional OSD data from OSD processor 1104 into mixed output video data. The mixed video output data is then provided to MUXs 1120 and 1124.

For the first set of processing elements 1101, MUX 1120 may select from mixed output video data, HD data provided on HD bypass 1122, or data from background insertion block 1110. The selected data is provided to output control processor 1126 which also receives the pixel clock. Output control processor 1126 then changes the data clock rate from the internal processing domain to the pixel clock rate according to the output mode desired.

For the second processing elements 1102, MUX 1124 may select from mixed output video data or data from background insertion block 1110$a$. The selected data is provided to output control processor 1128 which also receives the pixel clock. Output control processor 1128 then changes the data clock rate from the internal processing domain to the pixel clock rate according to the output mode desired. MUX 1132 provides either the received selected data (601 Data Out) of MUX 1124 or optional OSD data from OSD processor 1104.

Raster Generation and Control processor 1130 also receives the pixel clock and includes counters (not shown) which generate the raster space, allowing control commands to be sent on a line by line basis to Display Control Processor 1140. Display Control processor 1140 coordinates timing with the external memory 130 and starts the processing for each processing chain 1101 and 1102 on a line by line basis synchronized with the raster lines. Processor 1130 also generates the horizontal, vertical and field synchronization signals (H, V and F).

Figure 11B:
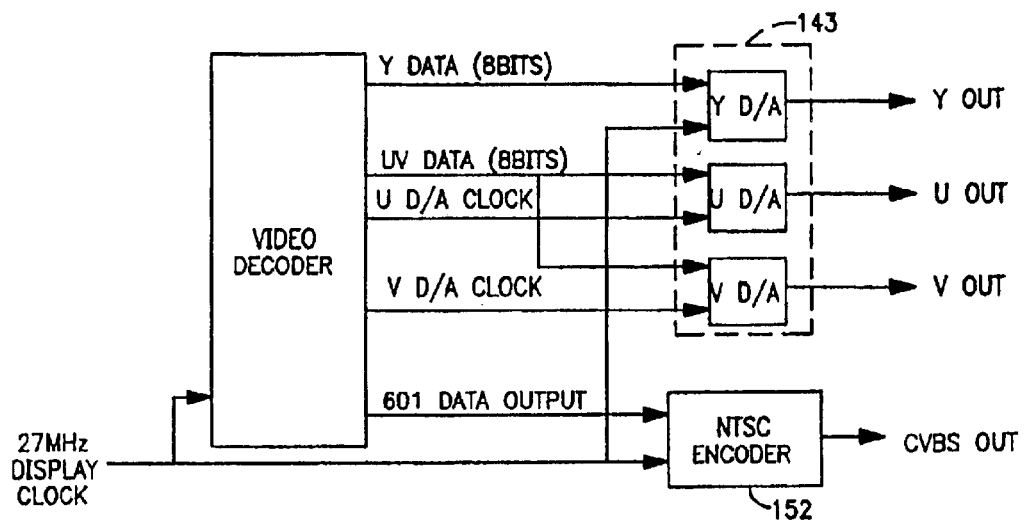
FIG. 11B is a block diagram which illustrates a 27 MHz Dual output mode of an exemplary embodiment of the present invention which, for which the video data is 525P or 525I, a first processing chain provides video data to a 27 MHz DAC well as to an NTSC Encoder.
Figure 11C:
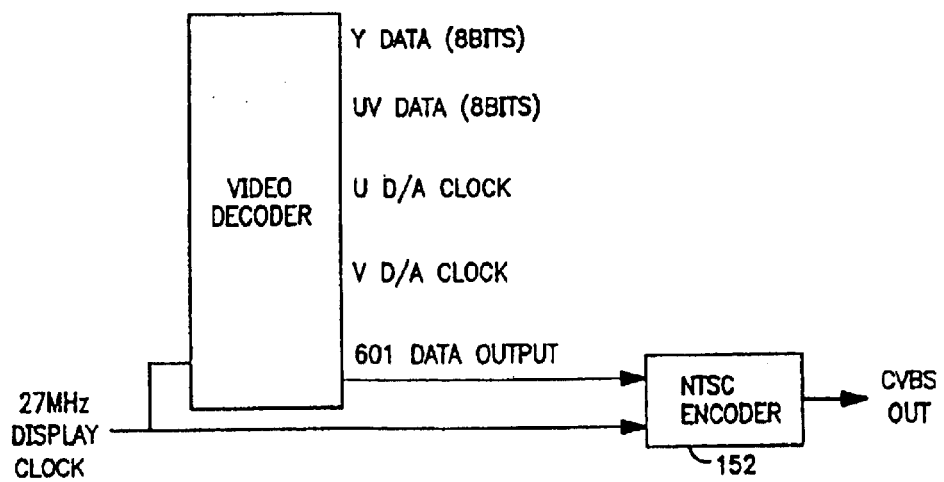
FIG. 11C is a block diagram which illustrates that, in the 27 MHz single output mode of an exemplary embodiment of the present invention, only a 525I video signal is provided to a NTSC encoder.
Figure 11D:
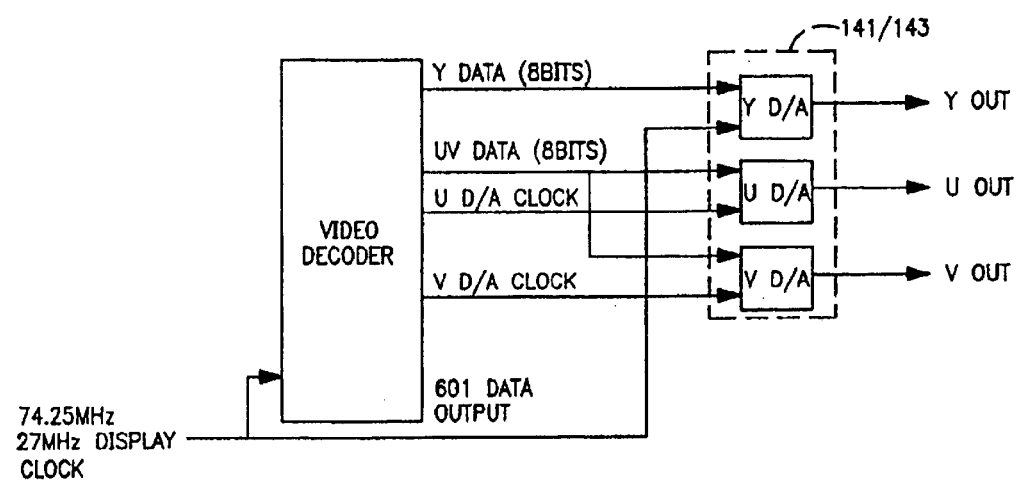
FIG. 11D is a block diagram which illustrates a 74 MHz/27 MHz mode of an exemplary embodiment of the present invention in which the output format matches the input format and the video data is provided to either a 27 MHz DAC or 74 MHz DAC depending on the input format.

FIGS. 11B through 11D relate the output modes provided by Display section 173 shown in FIG. 11A of the Video Decoder 121 to the active blocks of FIG. 1A. FIG. 11B illustrates a 27 MHz Dual output mode which, for which the video data is 525P or 525I, first processor 1101 (shown in FIG. 1A) provides 525P video data to 27 MHz DAC 143 as well as 525I data (601 Data Out) to NTSC Encoder 152. FIG. 11C illustrates that in 27 MHz single output mode, only 525I data (601 Data Out) is provided to NTSC encoder 152. FIG. 11D illustrates a 74 MHz/27 MHz mode in which the output mode matches the input format and the video data is provided to either the 27 MHz DAC 143 or 74 MHz DAC 141 depending on the output format. The 74 MHz DAC is used for 1920×1088 and 1280×720 pictures; the 27 MHz DAC is used for all other output formats.

Display conversion of the downsampled image frames is used for display the image in a particular format. As noted previously, the Display Conversion block 280 shown in FIG. 2B includes the vertical processing block (VPF) 282 and horizontal processing block (HZPF) 284 which adjust the down converted and down sampled images for display on the lower resolution screen.

VPF 282 which, for the exemplary embodiment, is a vertical line interpolation processor implemented as a programmable polyphase vertical filter, and HZPF 284 which, for the exemplary embodiment, is a horizontal line interpolation processor also implemented as a programmable horizontal polyphase filter. The filters are programmable, which is a design option in order to accommodate display conversion for a number of display formats.

As shown in FIG. 2B, four lines of downsampled pixel data enter the VPF 282 in raster order. For the exemplary embodiment this data includes luminance (Y) and chrominance ($C_R$ and $C_B$) pixel pairs which enter VPF 282 32 bits at a time. VPF 282 filters the four lines of data into one line and passes this line to the HZPF 284 as 32 bit values each containing luminance and chrominance data in a $YC_RYC_B$, and HZPF 284 then generates the correct number of pixels to match the desired raster format.

Figure 7A:
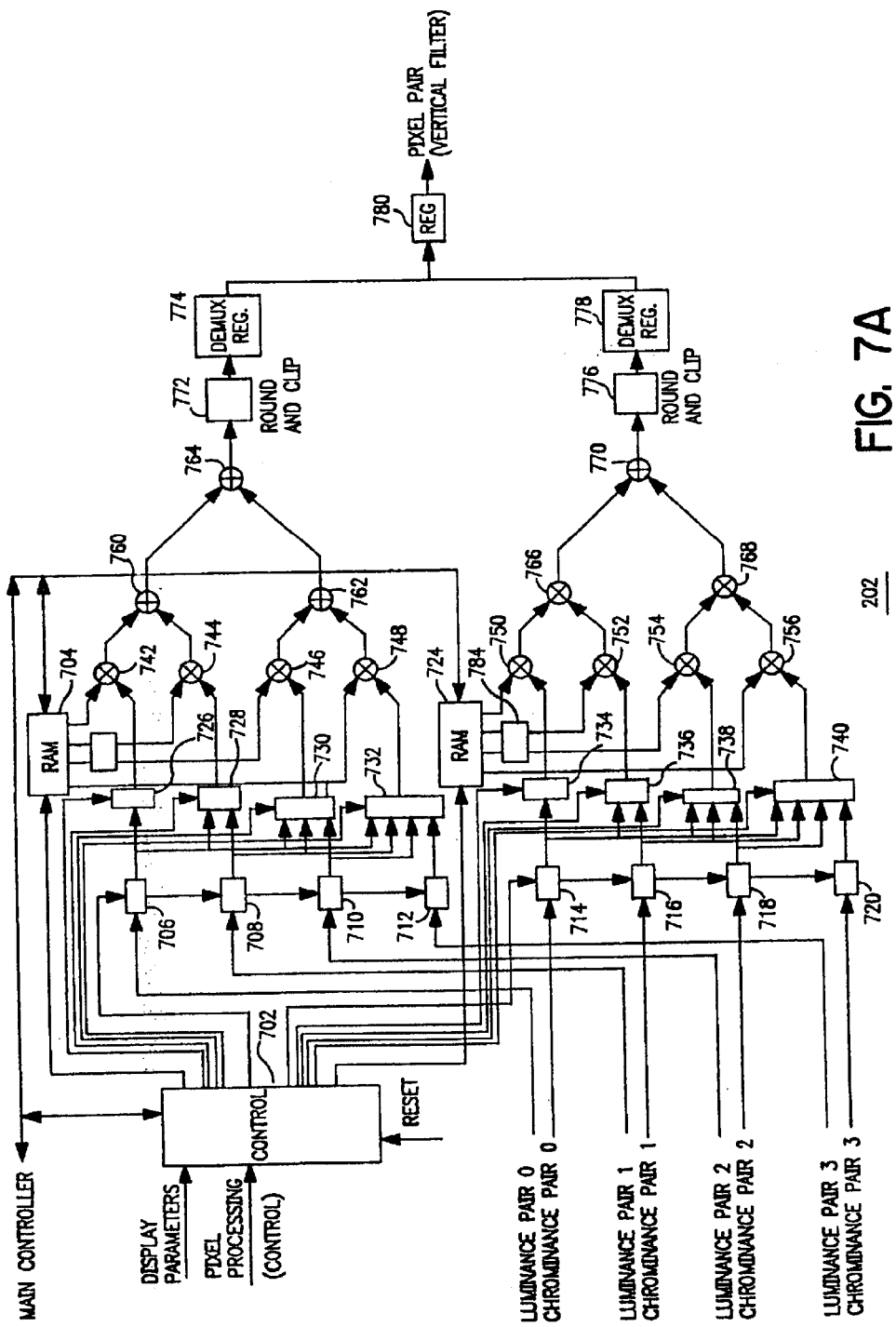
FIG. 7A is a block diagram illustrating a vertical programmable filter of one embodiment of the present invention.

FIG. 7A is a high level block diagram illustrating an exemplary filter suitable for use as the VPF 282 of one embodiment of the present invention. In the following, the VPF 282 is described as processing pairs of input pixels (each pair includes two luminance pixels, Y, pixel and a chrominance $C_R$ or $C_B$, pixel) to produce a pair of output pixels. This facilitates processing of the 4:2:0 format because color pixels may be easily associated with their corresponding luminance pixels. One skilled in the art, however, would realize that only luminance pixels or only chrominance pixels may be so processed. In addition, the VPF 282 as described produces lines in progressive format. In another embodiment employing a dual output and supporting both a main output channel and a secondary output channel, a second VPF 282 may be added.

Referring to FIG. 7A, VPF 282 includes a VPF Controller 702; first muliplexer network including Luminance Pixel MUXs (LP MUXs) 706, 708, 710, and 712 and Chrominance Pixel MUXs (CP MUXs) 714, 716, 718, and 720; second multiplexer network including Luminance Filter MUXs (LF MUXS) 726, 728, 730 and 732 and Chrominance Filter MUXs (CF MUXs) 734, 736, 738 and 740; Luminance Coefficient RAM 704; Chrominance Coefficient RAM 724; Luminance Coefficient Multipliers 742, 744, 746, and 748; Chrominance Coefficient Multipliers 750, 752, 754, and 756; Luminance Adders 760, 762 and 764; Chrominance Adders 766, 768 and 770; Round and Clip processors 772 and 776; Demux/Registers 774 and 778; and Output Register 780.

The operation of the VPF 282 is now described. Vertical resampling is accomplished with two 4-Tap polyphase filters, one for the Luminance pixels and one for the Chrominance pixels. The following details operation of the filter for the Luminance pixels only, since the operation for the Chrominance pixels is similar, but points out those differences in the paths as they occur. Vertical filtering of Luminance pixels can use up to 8 phases in the 4-Tap polyphase filter and filtering of Chrominance pixels can use up to 16 phases in the 4-Tap polyphase filter for the exemplary embodiment. The VPF Controller 702, at the beginning of afield or frame, resets the vertical polyphase filter, provides control timing to the first and second multiplexer networks, selects coefficient sets from Luminance Coefficient RAM 704 and Chrominance Coefficient RAM 724 for the polyphase filter phases, and includes a counter which counts each line of the field or frame as it is processed.

The VPF Controller 702, in addition to coordinating the operation of the network of MUXs and the polyphase filters, keeps track of display lines by tracking the integer and fractional parts of the vertical position in the decoded picture. The integer part indicates which lines should be accessed and the fractional part indicates which filter phase should be used. Furthermore, use of modulo N arithmetic when calculating the fractional part allows less than 16 phases to be used, which may be efficient for exact downsampling ratios such as 9 to 5. The fractional part is always truncated to one of the modulo N phases that are being used.

As shown in FIG. 7A, luminance and chrominance pixel pairs from the four image lines are separated into a chrominance path and a luminance path. The 16 bit pixel pair data in the luminance path may be further multiplexed into an 8-bit even (Y-even) and 8-bit odd (Y-odd) format by LP MUXs 706, 708, 710, and 712, and the 16 bit pixel pair in the chrominance path into an 8-bit $C_R$ and 8-bit $C_B$ format by CP MUXs 714, 716, 718 and 720. The luminance filter MUXs 706, 708, 710 and 712 are used to repeat pixel values of a line at the top and a line at the bottom at the boundaries of a decoded image in order to allow filter pixel boundary overlap in the polyphase filter operation.

Pixel pairs for the four lines corresponding to luminance pixel information and chrominance pixel information are then passed through the respective polyphase filters.

Coefficients used by Multipliers 742, 744, 746 and 748 for weighting of pixel values for a filter phase are selected by the VPF Controller 702 based on a programmed up or down sampling factor. After combining the weighted luminance pixel information in Adders 760, 762 and 764, the value is applied to the Round and Clip processor 772 which provides eight bit values (since the coefficient multiplication occurs with higher accuracy). DEMUX register 774 receives the first 8 bit value corresponding to an interpolated 8 bit even (Y-even) luminance value and second 8-bit value corresponding to the interpolated 8-bit odd (Y-odd) value, and provides a vertical filtered luminance pixel pair in 16 bits. Register 780 collects and provides the vertical filtered pixels in the luminance and chrominance paths and provides them as vertically filtered 32 bit values containing a luminance and chrominance pixel pair.

Figure 7B:
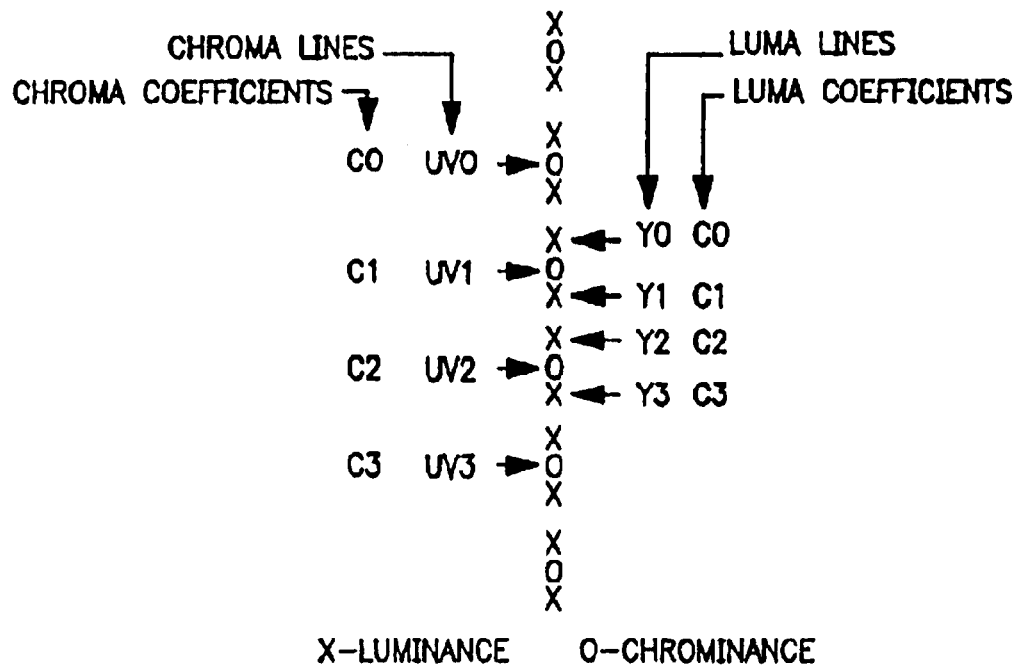
FIG. 7B is a pixel diagram which illustrates the spatial relationships between vertical filter coefficients and a pixel sample space of lines of the vertical programmable filter of FIG. 7A.

FIG. 7B shows the spatial relationships between the coefficients and pixel sample space of the lines. The coefficients for the luminance and chrominance polyphase filter paths each have 40 bits allocated to each coefficient set, and there is one coefficient set for each phase. The coefficients are interpreted as fractions with a denominator of 512. The coefficients are placed in the 40-bit word from left to right, C0 to C3. C0 and C3 are signed ten bit 2's complement values, and C1 and C2 are 10 bits which have a given range, for example, from −256 to 767, which are each subsequently converted to 11-bit 2's complement values.

FIG. 7A includes an optional luminance coefficient adjustment 782 and chrominance coefficient adjustment 784. These coefficient adjustments 782 and 784 are used to derive the 11 bit 2's complement number for C1 and C2. If bits 8 and 9(the most significant bit) are both 1, then the sign of the eleven bit number is 1 (negative), otherwise the value is positive.

Figure 8A:
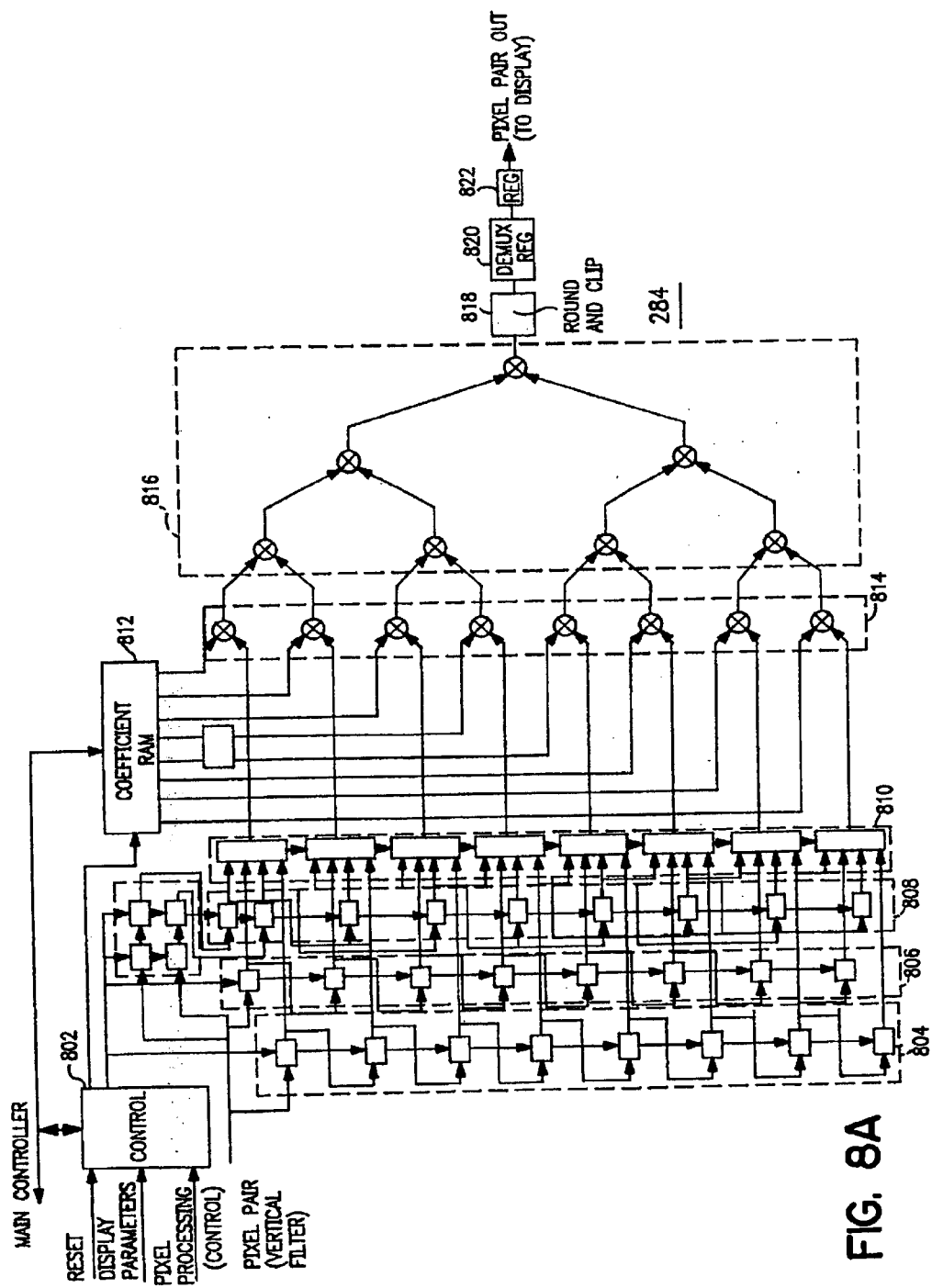
FIG. 8A is a block diagram illustrating a horizontal programmable filter of one embodiment of the present invention.

FIG. 8A is a high level block diagram illustrating an exemplary filter suitable for use as the HZPF 284 of one embodiment of the present invention. HZPF 284 receives a luminance and chrominance pixel information pair, which may be 32-bit data, from the VPD 282. The HZPF 284 includes a HZPF Controller 802; $C_R$ latches 804; $C_B$ latches 806; Y latches 808; Selection MUXs 810; Horizontal Filter Coefficient RAM 812; Multiplying network 814; Adding network 816; Round and Clip processor 818, DEMUX register 820 and output register 822.

Horizontal resampling is accomplished by employing an 8 tap, 8 phase polyphase filter. Generation of display pixels is coordinated by the HZPF Controller 802 by tracking the integer and fractional parts of the horizontal position in the decoded and downsampled picture. The integer part indicates which pixels are to be accessed and the fractional part indicates which filter phase should be used. Using modulo N arithmetic when calculating the fractional part may allow for less than 8 phases to be used. For example, this may be useful if an exact downsampling ratio such as 9 to 5 is used. If the down-sampling ratio cannot be expressed as a simple fraction, the fractional part is truncated to one of the N phases. The HZPF 284 of the exemplary embodiment of the present invention filters pixel pairs, and uses alignment on even pixel boundaries to facilitate processing of the 4:2:0 formatted picture and to keep the $C_R$ and $C_B$ pixels (the color pixels) together with the corresponding Y pixels.

The operation of the HZPF 284 is now described with reference to FIG. 8A. The HZPF Controller 802, at the beginning of a horizontal line, resets the horizontal polyphase filter, provides control timing to the first and second multiplexer networks, selects coefficient sets from Horizontal Coefficient RAM 812 for the $C_R$, $C_B$ and Y filter coefficients for each of the polyphase filter phases, and selects each set of $C_R$, $C_B$ and Y values for processing. In addition, when the horizontal position is near the left or right side of the line, the HZPF Controller 802 forces the edge pixel values to be repeated or set to 0 for use by the 8-tap polyphase filter. Any distortion in the image caused by this simplification is usually hidden in the overscan portion of the displayed image.

The pixel data received from the VPF 282 is separated into Y, $C_R$ and $C_B$ values, and these values are individually latched into $C_R$ latches 804; $C_B$ latches 806; and Y latches 808 for filtering. The HZPF Controller 802 then selects the Y, $C_R$ and $C_B$ values by an appropriate signal to the selection MUXs 810. In the exemplary embodiment, there are more Y values than $C_R$ or $C_B$ values so the filter uses additional latches in the Y luminance latches 808. At the same time, the HZPF Controller 802 selects the appropriate filter coefficients for the filter phase, and for the $C_R$ or $C_B$ or Y values, based on a programmed upsampling or downsampling value by a control signal to Horizontal Filter Coefficient RAM 812.

Horizontal Filter Coefficient RAM 812 then outputs the coefficients to the respective elements of the Multiplying Network 814 for multiplication with the input pixel values to produce weighted pixel values, and the weighted pixel values are combined in Adding Network 816 to provide a horizontally filtered $C_R$, $C_B$ or Y value.

After combining the weighted pixel values in Adding network 816, the horizontally filtered pixel value is applied to the Round and Clip processor which provides eight-bit values (since the coefficient multiplication occurs with higher accuracy). DEMUX register 820 receives a series of 8 bit values corresponding to a $C_R$ value, an 8 bit even (Y-even) Y value, an eight-bit $C_B$ value, and finally an eight-bit value corresponding to an 8-bit odd (Y-odd) Y value; and the DEMUX register 820 multiplexes the values into a horizontally filtered luminance and chrominance pixel pair having a 32 bit value (Y even, $C_R$, Y odd, $C_B$). Register 822 stores and provides the pixel pair as a vertically and horizontally filtered 32 bit pixel luminance and chrominance pixel pair.

Figure 8B:
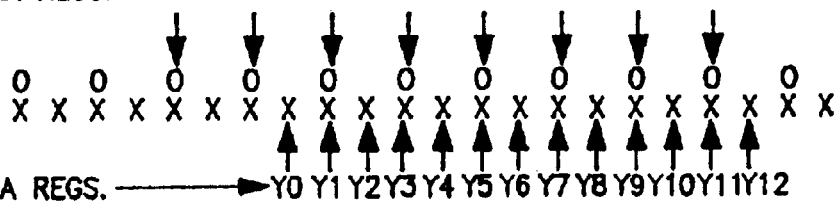
FIG. 8B is a pixel diagram which illustrates spatial relationships between horizontal filter coefficients and pixel sample values of one embodiment of the present invention.

FIG. 8B illustrates the spatial relationships between coefficients stored in Horizontal Filter Coefficient RAM 812 and used in the polyphase filter and the pixel sample values of the down sampled image for a horizontal line. The coefficients for the exemplary embodiment are placed in a 64 bit word from left to right, C0 to C7. The coefficients C0, C1, C6 and C7 are signed 7-bit 2's complement values, and C2 and C5 are signed 8-bit 2's complement and C3 and C4 are signed 10-bit 2's complement values representing a range from −256 to 767. C3 and C4 are adjusted to derive the 11-bit 2's complement values. If both bit 8 and bit 9 (the most significant bit) are 1, then the sign of the 11-bit value is 1 (negative), otherwise the value is 0 (positive). All coefficients can be interpreted as fractions with a denominator of 512.

Table 13 lists coefficient for the VPF 282 and HZPF 284 for exemplary embodiments of the present invention performing the indicated format conversion.

TABLE 13

| | Tap 0 | Tap 1 | Tap 2 | Tap 3 |
|---|---|---|---|---|
| Coefficients for 750P to 525P or 750P to 525I 4 tap and 2 polyphase Luminance Vertical Filter | | | | |
| Phase 0 | 103 | 306 | 103 | 0 |
| Phase 1 | 10 | 246 | 246 | 10 |
| Coefficients for 750P to 525P or 750P to 525I 4 tap and 4 polyphase Chrominance Vertical Filter | | | | |
| Phase 0 | 25 | 462 | 25 | 0 |
| Phase 1 | −33 | 424 | 145 | −24 |
| Phase 2 | −40 | 296 | 296 | −40 |
| Phase 3 | −24 | 145 | 424 | −33 |
| Coefficients for 750P to 525I 4 tap and 2 polyphase Luminance Vertical Filter | | | | |
| Phase 0 | 145 | 222 | 145 | 0 |
| Phase 1 | 84 | 172 | 172 | 84 |

TABLE 13-continued

|  | Tap 0 | Tap 1 | Tap 2 | Tap 3 |
|---|---|---|---|---|
| Coefficients for 750P to 525I 4 tap and 4 polyphase Chrominance Vertical Filter | | | | |
| Phase 0 | 57 | 398 | 57 | 0 |
| Phase 1 | −6 | 382 | 166 | −30 |
| Phase 2 | −29 | 285 | 285 | −29 |
| Phase 3 | −30 | 166 | 382 | −6 |
| Coefficients for 1125I to 525P 4 tap and 8 polyphase Luminance Vertical Filter | | | | |
| Phase 0 | 20 | 472 | 20 | 0 |
| Phase 1 | −20 | 425 | 70 | 37 |
| Phase 2 | −52 | 472 | 161 | −69 |
| Phase 3 | −62 | 397 | 238 | −61 |
| Phase 4 | −63 | 319 | 319 | −63 |
| Phase 5 | −61 | 238 | 397 | −62 |
| Phase 6 | −69 | 161 | 472 | −52 |
| Phase 7 | 37 | 70 | 425 | −20 |
| Coefficients for 1125I to 525P 4 tap and 16 polyphase Chrominance Vertical Filter | | | | |
| Phase 0 | 29 | 454 | 29 | 0 |
| Phase 1 | 13 | 455 | 49 | −5 |
| Phase 2 | 0 | 445 | 73 | −6 |
| Phase 3 | −9 | 428 | 101 | −8 |
| Phase 4 | −15 | 404 | 132 | −9 |
| Phase 5 | −18 | 376 | 165 | −11 |
| Phase 6 | −20 | 345 | 201 | −14 |
| Phase 7 | −19 | 310 | 237 | −16 |
| Phase 8 | −18 | 274 | 274 | −18 |
| Phase 9 | −16 | 237 | 310 | −19 |
| Phase 10 | −14 | 201 | 345 | −20 |
| Phase 11 | −11 | 165 | 376 | −18 |
| Phase 12 | −9 | 132 | 404 | −15 |
| Phase 13 | −8 | 101 | 428 | −9 |
| Phase 14 | −6 | 73 | 445 | 0 |
| Phase 15 | −5 | 49 | 455 | 13 |

In the exemplary embodiments of the display conversion system horizontal conversion is, in part performed by the DCT domain filter 216, and the downsampling Processor 232 shown in FIG. 2B. These provide the same number of horizontal pixels (640) whether the conversion is from 1125I or 750P. Accordingly, the HZPF 284 upsamples these signals to provide 720 active pixels per line and passes 525P or 525I signals unmodified, as these signals have 720 active pixels per line as set forth above in Tables 1 and 2, the values of the coefficients of the Horizontal Filter do not change for conversion to 480P/480I/525P/525I. These Horizontal filter coefficients are given in Table 14.

TABLE 14

Coefficients for Horizontal Filter

|  | Tap 0 | Tap 1 | Tap 2 | Tap 3 | Tap 4 | Tap 5 | Tap 6 | Tap 7 |
|---|---|---|---|---|---|---|---|---|
| Phase 0 | −8 | 13 | −17 | 536 | −17 | 13 | −8 | 0 |
| Phase 1 | −13 | 28 | −62 | 503 | 48 | −9 | 0 | 17 |
| Phase 2 | −14 | 37 | −90 | 477 | 134 | −37 | 10 | −5 |
| Phase 3 | −13 | 38 | −96 | 406 | 226 | −64 | 22 | −7 |
| Phase 4 | −10 | 31 | −85 | 320 | 320 | −85 | 31 | −10 |
| Phase 5 | −7 | 22 | −64 | 226 | 406 | −96 | 38 | −13 |
| Phase 6 | −5 | 10 | −37 | 134 | 477 | −90 | 37 | −14 |
| Phase 7 | 17 | 0 | −9 | 48 | 503 | −62 | 28 | −13 |

Figure 9A:
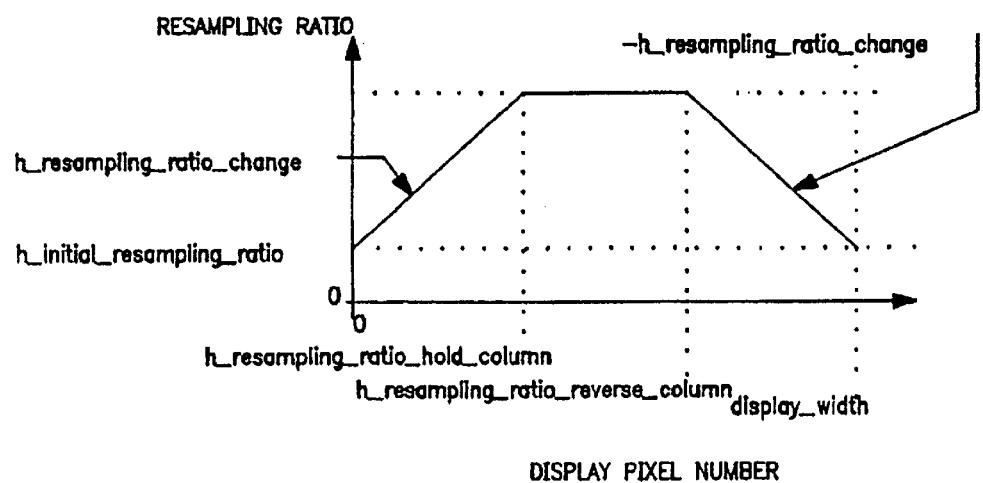
FIG. 9A is a graph of pixel number versus resampling ratio which illustrates a resampling ratio profile of an exemplary embodiment of the present invention.

In addition, the programmable capability of the HZPF 284 allows for a nonlinear horizontal scan. FIG. 9A illustrates a resampling ratio profile which may be employed with the present invention. As shown the resampling ratio of the HZPF 284 may be varied across the horizontal scan line and may be changed in piecewise linear fashion in the exemplary configuration of FIG. 9A, at the beginning of the scan line, the resampling ratio increases (or decreases) linearly until a first point on the scan line, where the resampling ration is held constant until a second point is reached where the resampling ratio decreases (or increases) linearly. Referring to FIG. 9A, h_initial_resampling ratio is the initial resampling ratio for a picture, h_resampling_ratio_change is the first change per pixel in the resampling ratio, −h_resampling_ratio_change is the second change per pixel in the resampling ratio, and h_resampling_ratio_hold column and h_resampling_ratio_reverse_column are the display column pixel points between which the resampling ratio is held constant. The value display_width is the last pixel (column) of the picture line.

Figure 9B:
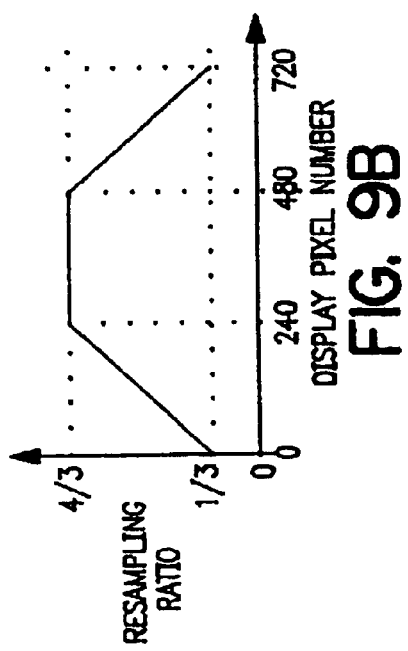
FIG. 9B is a graph which shows a first ratio profile for mapping a 4:3 picture onto a 16:9 display.
Figure 9C:
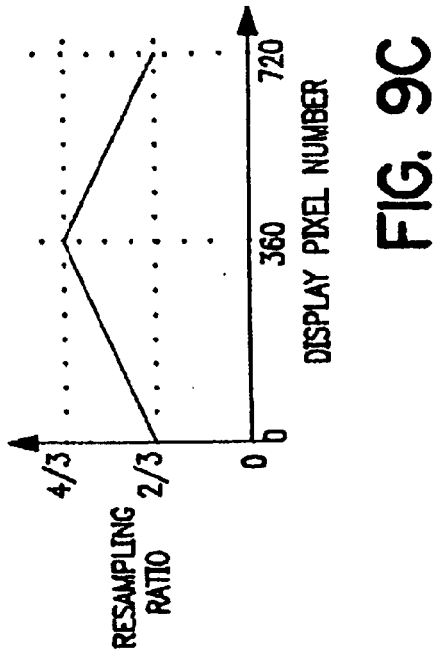
FIG. 9C is a graph which shows a second ratio profile for mapping a 4:3 picture onto a 16:9 display.
Figure 9D:
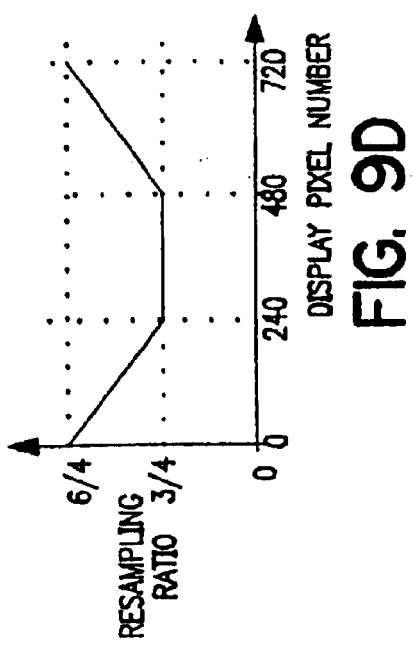
FIG. 9D is a graph which shows a first ratio profile for mapping a 16:9 picture onto a 4:3 display.
Figure 9E:
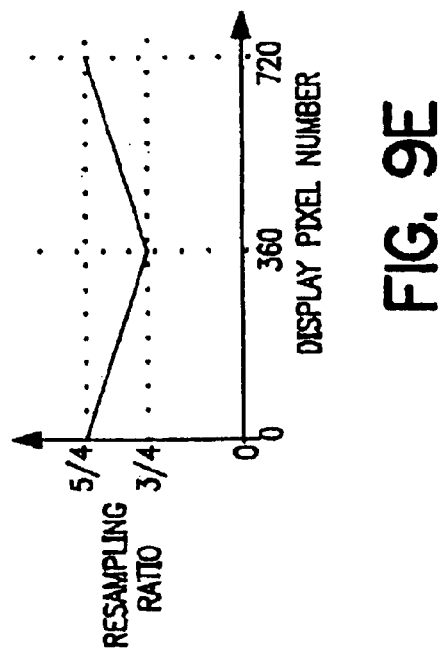
FIG. 9E is a graph which shows a second ratio profile for mapping a 16:9 picture onto a 4:3 display.

FIGS. 9B and 9C show ratio profiles for mapping a 4:3 picture onto a 16:9 display. The ratios are defined in terms of input value to output value, so 4/3 is downsampling by 4 to 3 and 1/3 is up sampling 1 to 3. The ratio profiles shown in FIGS. 9B and 9C map an input picture image having 720 active pixels to a display having 720 active pixels. For example, in FIG. 9B mapping a 4:3 aspect ratio display to a 16×9 aspect ratio display uses a 4/3 downsampling, but to fill all the samples of the display requires a 1/1 average across the horizontal line. Consequently, the profile of FIG. 9B has the correct aspect ratio in the center between display pixels 240 and 480, while the values at the sides are upsampled to fill the display. FIGS. 9D and 9E illustrate the profiles used for resizing from a 16×9 display image to a 4:3 display which is the inverse of the profiles shown in FIGS. 9B and 9C.

Figure 10:
FIG. 10 is a chart of image diagrams which illustrates the effect of using resampling ratio profiles according to an exemplary embodiment of the present invention.

The effect of using resampling ratio profiles according to an exemplary embodiment of the present invention may be seen pictorially in FIG. 10. A video transmission format having either a 16×9 or 4×3 aspect ratio may be displayed as either 16×9 or 4×3, but the original video picture may be adjusted to fit within the display area. Consequently, the original video picture may be shown in full, zoom, squeeze, or variable expand/shrink.

The system allows users to select a preferred mapping between the aspect ratio of the received video signal and the aspect ratio of the display device, when these aspect ratios are incompatible. As set forth above, the control processor 207 (shown in FIG. 2A) receives the aspect ratio of the received image from the parser 209. The control processor 207 also determines the aspect ratio of the display device (not shown) which is connected to receive the output signal of the system. If, for example, the display device is connected to the S-video output 153 or the composite video output 154 (both shown in FIG. 1A), then the aspect ratio of the display device must be 4 by 3. If, however, the display device is connected to the primary video output port 146, the aspect ratio may be either 4 by 3 or 16 by 9.

In the exemplary embodiment of the invention, the user specifies the aspect ratio of the display device as a part of a start-up process which may be invoked through the remote control IR receiver 208 (shown in FIG. 2A). The start up process may only be run if the video decoder system includes a primary output port and the system senses that there is a display device coupled to the primary output port. The start-up process may determine the display format of the display device (i.e. aspect ratio and maximum video resolution) in several ways. First, the process may present the user with a menu of possible display devices, each represented, for example, by a manufacturer name and model number. The user may then use the remote control device to select one of these display devices. The decoder system may be configured with a modem to periodically contact a central location to receive an updated list of display types as well as other updates to the programming of the controller 207. Alternatively, this type of information may be encoded in the user data of a received ATSC video signal and the decoder may be programmed to access this information to update its internal programming.

Alternatively, to determine the aspect ratio of the display device, the user may be presented with a menu showing a 4 by 3 rectangle and a 16 by 9 rectangle and asked to indicate which is more like their display device. As another alternative, the user may asked to choose two menu choices, one listing possible video display resolutions and another listing possible aspect ratios.

As yet another alternative, the control processor 207 may program the on-screen display generator to produce a figure, for example a circle, in several different signal resolutions (e.g. 525I, 525P, 750P, 1180I and 1180P) and several different aspect ratios (e.g. 4 by 3 and 16 by 9), with text asking the viewer to press a button on the remote control device (not shown) when the best circle is displayed. The system may sequentially provide each of these images for a few seconds at the primary output to correlate the pressing of the button on the remote control device with the display of a particular image. This will provide the system with the needed information on image resolution and aspect ratio for the display device.

With information on the display format of the display device, the system may automatically adapt the received video signal for the best possible presentation on the display device. When, for example, there is a mismatch between the aspect ratio of the received video signal and the aspect ratio of the display device, this may be indicated to the viewer and the viewer may be allowed, by invoking a command using the remote control device (not shown), to sequentially see all of the possible conversions between the two aspect ratios, as shown in FIGS. 9A through 9E and FIG. 10, and to select one of these conversions to be used. This applies when the aspect ratio of the received video signal is 4 by 3 and the aspect ratio of the display device is 16 by 9 as well as when the aspect ratio of the received video signal is 16 by 9 and the aspect ratio of the display device is 4 by 3.

As a final alternative, the system may be configured to sense information provided by the display device in order to determine the display format. For example, a two-way data path may be provided via one of the output signal lines (Y, CR, CB) of the decoder system by which data in a digital register in the display device may be read. The data in this register may indicate a manufacturer and model number or a maximum resolution and aspect ratio for the display device. Alternatively, the display device may impose a direct-current (DC) signal on one or more of these lines and this signal may be sensed by the decoder system as an indication of the display format of the display device.

It is contemplated that a multi-sync monitor, which is capable of displaying video signals having several different display formats may be connected to the primary output port of the video decoder. In this instance, the video resolution component of the display type information recovered by the control processor 207 desirably includes an indication that the display is a multi-sync device so that the only format conversion that occurs is the aspect ratio adaptation shown in FIGS. 9A through 9E and FIG. 10, when the aspect ratio of the received video signal does not match that of the display device.

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed:

1. A digital video signal conversion system for decoding and reformatting a baseband encoded digital video signal which sequentially represents first and second video display formats to produce a decoded video signal suitable for display in a predetermined video display format, each video display format having an aspect ratio and a resolution, the system comprising:

a digital video signal decoder including:
an input terminal coupled to receive the encoded digital video signal;
data retrieval circuitry which extracts from the encoded digital video signal an indication of the video display format for the decoded video signal; and
signal processing circuitry which decodes the encoded digital video signal to produce an output video signal, wherein the decoder is responsive to a control signal to process the encoded digital video signal according to respective first and second down conversion processes to produce an output signal in the predetermined video display format from encoded digital video signals in the respective first and second video display formats; and a controller, coupled to receive data which identifies the extracted video display format, the controller producing control signals for the digital video signal decoder which cause the decoder to convert the encoded digital video signal corresponding to the extracted display format into the output video signal having the predetermined video display format in both the first and second intervals;

wherein the encoded digital video signal is encoded using a frequency-domain transform operation and the digital video signal decoder includes a low-pass filter which operates on the frequency domain coefficient of the frequency-domain transformed digital video signal to cause the digital video signal decoder to produce a decoded digital video signal having a resolution less than a resolution specified by the extracted video display format.

2. A digital video signal conversion system according to claim 1, wherein the digital video signal decoder includes a programmable spatial filter which is responsive to a format conversion control signal provided by the controller to resample the decoded digital video signal provided by the digital video decoder to produce the output video signal having the predetermined video display format.

3. A digital video signal conversion system according to claim 2, wherein the digital video signal is encoded using an encoding technique specified by the moving pictures experts group (MPEG) in which the encoded digital video signal is contained in a plurality of packetized elementary stream (PES) packets, each PES packet having a header, and the data retrieval circuitry of the digital video signal decoder includes means for extracting the video display format of the encoded digital video signal from the header of one of the PES packets.

4. A digital video signal conversion system according to claim 2, wherein the digital video signal is encoded using an encoding technique specified by the moving pictures experts group (MPEG) in which the encoded digital video signal is contained in a digital bit-stream including sequence records, each sequence record having a header, and the data retrieval circuitry of the digital video signal decoder includes means for extracting the video display format of the encoded digital video signal from the header of one of the sequence records.

5. A digital video signal conversion system according to claim 1 further including a user input device through which a user may enter the data which identifies the predetermined video display format.

6. A digital video signal conversion system according to claim 1 wherein the video display device includes a register which holds an identification signal and the controller is coupled to the display device to read the identification signal and, use the identification signal to generate the data identifying the predetermined video display format.

7. A digital video signal conversion system according to claim 1, wherein the digital video signal decoder further includes:
   analog to digital conversion means for converting the output signal of the signal processing circuitry of the video decoder to an analog signal;
   transmission means for applying the analog signal to the display device;
   means, coupled to the controller, for sensing a direct current (DC) potential applied to the transmission means by the display device;
   wherein the controller, responsive to the means for sensing, identifies the predetermined video display format to be used by the digital video signal decoder.

8. A digital video signal conversion system according to claim 5 wherein:
   the video signal decoder further includes an on-screen display processor which may be programmed to produce a plurality of output video signals, each corresponding to a respectively different one of the plurality of video display formats; and
   the controller includes means, responsive to a first user control signal provided via the user input device, to cause the on-screen display device to sequentially provide video signals having respectively different video display formats and responsive to a second selection signal provided via the user input device to define one of the respective video display formats as the predetermined video display format.

9. A digital video signal conversion system for decoding and reformatting a baseband encoded digital video signal, which is encoded using a frequency-domain transform operation and which may represent a plurality of video display formats, to produce a decoded video signal, each video display format having an aspect ratio and a resolution, the system comprising;
   a display device having a predetermined video display format;
   a digital video signal decoder including:
      an input terminal coupled to receive the encoded digital video signal;
      data retrieval circuitry which extracts from the encoded digital video signal an indication of the video display format for the decoded video signal;
      a low-pass filter, responsive to a first control signal, which operates on frequency domain coefficients of the frequency-domain transformed digital video signal to selectivity cause the digital video signal decoder to produce a decoded digital video signal having a resolution less than the resolution of the extracted video display format; and
      signal processing circuitry, responsive to a second control signal, which decodes the filtered frequency domain encoded digital video signal to produce an output video signal; and
   a controller, coupled to receive data which identifies the predetermined video display format and the extracted video display format, the controller producing the control signals for the digital video signal decoder which cause the decoder to convert the encoded digital video signal corresponding to the extracted display format into the output video signal having the predetermined video display format.

10. A digital video signal conversion system according to claim 9, wherein:
   the digital video signal decoder further includes a programmable spatial filter which is responsive to a format conversion control signal to resample the decoded digital video signal provided by the signal processing circuitry to produce the output video signal having the predetermined video display format; and
   the controller produces the format conversion control signal.

11. A digital video signal conversion system according to claim 10, wherein the digital video signal is encoded using an encoding technique specified by the moving pictures experts group (MPEG) in which the encoded digital video signal is contained in a plurality of packetized elementary stream (PES) packets, each PES packet having a header, and the data retrieval circuitry of the digital video signal decoder includes means for extracting the video display format of the encoded digital video signal from the header of one of the PES packets.

12. A digital video signal conversion system according to claim 10, wherein the digital video signal is encoded using an encoding technique specified by the moving pictures experts group (MPEG) in which the encoded digital video signal is contained in a digital bit-stream including sequence records, each sequence record having a header, and the data retrieval circuitry of the digital video signal decoder includes means for extracting the video display format of the encoded digital video signal from the header of one of the sequence records.

13. A digital video signal conversion system according to claim 10 further including a user input device through which a user may enter the data which identifies the predetermined video display format.

14. A digital video signal conversion system according to claim 12 wherein:
   the video signal decoder further includes an on-screen display processor which may be programmed to produce a plurality of output video signals, each corresponding to a respectively different one of the plurality of video display formats; and
   the controller includes the means, responsive to a first user control signal provided via the user input device, to cause the on-screen display device to sequentially provide video signals having respectively different video display formats and responsive to a second selection signal provided via the user input device to define one of respective video display formats as the predetermined video display format.

15. A digital video signal conversion system according to claim 10 further including a video display device having the predetermined video display format, wherein the video display device includes a register which holds an identification signal and the controller is coupled to the display device to read the identification signal and, use the identification signal to generate the data identifying the predetermined video display format.

16. A digital video signal conversion system for decoding and reformatting a baseband encoded digital video signal which is encoded using a frequency domain transform operation and which represents a video display format having a first aspect ratio to produce a decoded video signal suitable for display in a predetermined video display format having a second aspect ratio, different from the first aspect ratio, the system comprising:

a digital video signal decoder including:
an input terminal coupled to receive the encoded digital video signal;
data retrieval circuitry which extracts from the encoded digital video signal an indication of the aspect ratio for the decoded video signal; and
signal processing circuitry which decodes the encoded digital video signal to produce an output video signal, wherein the decoder is responsive to a control signal to process the encoded digital video signal according to respective first and second down conversion processes, each of the first and second down conversion processes including a low-pass filter which operates on frequency domain coefficient of the frequency-domain encoded video signal to produce an output signal in the predetermined video display format having respective first and second conversions between the first aspect ratio and the second aspect ratio; and a controller, coupled to receive data which identifies the extracted video display format, the controller producing control signals for the digital video signal decoder which cause the decoder to sequentially convert the decoded video signal having the first aspect ratio into a first and second output signals having, respectively, the first and second conversions between the first aspect ratio and the second aspect ratio.

17. A digital video signal conversion system according to claim 16, wherein the fist aspect ratio is wider than the second aspect ratio and the first and second conversions use respective first and second compression techniques to produce the output signal having the second aspect ratio.

18. A digital video signal conversion system according to claim 16, wherein the first aspect ratio is narrower than the second aspect ratio and the first and second conversions use respective first and second expansion techniques to produce the output signal having the second aspect ratio.

* * * * *